(12) United States Patent
Uto et al.

(10) Patent No.: US 10,955,593 B2
(45) Date of Patent: Mar. 23, 2021

(54) LIGHT SOURCE UNIT

(71) Applicant: Toray Industries, Inc., Tokyo (JP)

(72) Inventors: Takayuki Uto, Otsu (JP); Wataru Gouda, Otsu (JP); Takahito Sakai, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 16/644,029

(22) PCT Filed: Sep. 10, 2018

(86) PCT No.: PCT/JP2018/033484
§ 371 (c)(1),
(2) Date: Mar. 3, 2020

(87) PCT Pub. No.: WO2019/065188
PCT Pub. Date: Apr. 4, 2019

(65) Prior Publication Data
US 2020/0348457 A1  Nov. 5, 2020

(30) Foreign Application Priority Data

Sep. 27, 2017 (JP) .............................. JP2017-185730
Apr. 20, 2018 (JP) .............................. JP2018-081306

(51) Int. Cl.
*G02B 5/08* (2006.01)
*G02B 1/04* (2006.01)
*G02F 1/13357* (2006.01)

(52) U.S. Cl.
CPC ............. *G02B 5/0841* (2013.01); *G02B 1/04* (2013.01); *G02F 1/133605* (2013.01); *G02F 1/133603* (2013.01); *G02F 2001/133614* (2013.01)

(58) Field of Classification Search
CPC ...... G02B 5/0841; G02B 1/04; G02B 6/0053; G02F 1/133603; G02F 1/133605; G02F 2001/133614
See application file for complete search history.

(56) References Cited

U.S. PATENT DOCUMENTS 8,075,148 B2  12/2011 Nada
10,423,030 B2  9/2019 Kishimoto et al.
(Continued)

FOREIGN PATENT DOCUMENTS

JP  2001164245 A  6/2001
JP  2007273440 A  10/2007
(Continued)

OTHER PUBLICATIONS

Fedors, R., "A Method for Estimating Both the Solubility Parameters and Molar Volumes of Liquids", Polymer Engineering and Science, Feb. 1974, vol. 14, No. 2, pp. 147-154.
(Continued)

*Primary Examiner* — Rajarshi Chakraborty
*Assistant Examiner* — Michael Chiang
(74) *Attorney, Agent, or Firm* — RatnerPrestia

(57) ABSTRACT

The present invention provides a light source unit capable of displaying an image of a desired color without causing color unevenness when mounted on a display. A light source unit including: a light source; a color conversion member that converts incident light incident from the light source into light having a longer wavelength than the incident light does; and a reflective film that is present between the light source and the color conversion member, transmits light incident from the light source, and reflects light exited from the color conversion member, wherein in the reflective film, the scattering angle (R2−R1) on at least one film surface is 5° or more, where the scattering angle is obtained from (Continued)

angles R1 and R2 (R1<R2) at which the transmitted light intensity is Tmax(0)/100 relative to the maximum transmitted light intensity of halogen light incident perpendicularly to the film surface of Tmax(0).

19 Claims, 3 Drawing Sheets

(56) References Cited

U.S. PATENT DOCUMENTS

| | | | | |
|---|---|---|---|---|
| 2007/0047254 | A1* | 3/2007 | Schardt | G02B 5/0294 |
| | | | | 362/607 |
| 2016/0070137 | A1* | 3/2016 | You | G02F 1/133603 |
| | | | | 349/71 |
| 2016/0216559 | A1* | 7/2016 | De Jesus Cazarez Lopez | |
| | | | | G02F 1/133606 |
| 2018/0080625 | A1* | 3/2018 | Yamada | F21V 9/30 |
| 2018/0149914 | A1* | 5/2018 | Lee | G02B 6/0055 |
| 2018/0292712 | A1* | 10/2018 | Kishimoto | F21V 7/30 |

FOREIGN PATENT DOCUMENTS

| | | |
|---|---|---|
| JP | 2007307893 A | 11/2007 |
| JP | 2009140822 A | 6/2009 |
| JP | 2011241160 A | 12/2011 |
| JP | 2012022028 A | 2/2012 |
| JP | 2016046266 A | 4/2016 |
| JP | 2017084827 A | 5/2017 |
| WO | 2016186158 A1 | 11/2016 |

OTHER PUBLICATIONS

International Search Report and Written Opinion for International Application PCT/JP2018/033484, dated Nov. 20, 2018, 5 pages.

* cited by examiner

LIGHT SOURCE UNIT

CROSS REFERENCE TO RELATED APPLICATIONS

This is the U.S. National Phase application of PCT/JP2018/033484, filed Sep. 10, 2018, which claims priority to Japanese Patent Application No. 2017-185730, filed Sep. 27, 2017 and Japanese Patent Application No. 2018-081306, filed Apr. 20, 2018, the disclosures of each of these applications being incorporated herein by reference in their entireties for all purposes.

FIELD OF THE INVENTION

The present invention relates to a light source unit used in, for example, a liquid crystal display.

BACKGROUND OF THE INVENTION

Application of multi-color techniques based on a color conversion system to liquid crystal displays, organic EL displays, illumination, and the like is actively studied. The "color conversion" means to convert light emitted from a light emitter into light having a longer wavelength, and, for example, refers to convert blue light emission into green or red light emission.

Forming a composition having the color conversion function into a sheet and combining the sheet with, for example, a blue light source makes it possible to extract the three primary colors of blue, green, and red, that is, to extract white light from the blue light source. Using, as a backlight unit, such a white light source that is a combination of a blue light source and a sheet having a color conversion function, and combining the backlight unit with a liquid crystal driving section and a color filter makes it possible to produce a full color display. Further, the white light source without a liquid crystal driving section can be used as it is, and can be applied as a white light source of LED illumination, for example.

One of problems of liquid crystal displays based on the color conversion system is improvement in color reproducibility. In order to improve color reproducibility, it is effective to increase the color purity of blue, green, and red colors by narrowing the half widths of emission spectra of blue, green, and red of the backlight unit. One technique proposed as a means for solving the problem is a technique of using quantum dots, which are inorganic semiconductor fine particles, as a component of a color conversion member (see, for example, Patent Document 1). Although the technique of using quantum dots actually narrows the half widths of emission spectra of green and red to improve the color reproducibility, the quantum dots are weak against heat, and moisture and oxygen in the air, and are insufficient in durability.

There has also been proposed a technique of using an organic/inorganic light-emitting material as a component of a color conversion member instead of quantum dots. Examples of disclosed techniques of using an organic light-emitting material as a component of a color conversion member include a technique in which a coumarin derivative is used (see, for example, Patent Document 2), a technique in which a rhodamine derivative is used (see, for example, Patent Document 3), and a technique in which a pyrromethene derivative is used (see, for example, Patent Document 4).

In addition, although the quantum dot technique and use of a color conversion member made of an organic/inorganic light-emitting material improve color reproducibility, the techniques have another problem that the luminance is lowered due to such color characteristics and the light emission characteristics of the color conversion member. As a countermeasure for the problem, for example, a light source unit including a light wavelength selective reflective film that reflects light emitted from a color conversion member is disclosed (see, for example, Patent Document 5).

PATENT DOCUMENTS

Patent Document 1: Japanese Patent Laid-open Publication No. 2012-22028
Patent Document 2: Japanese Patent Laid-open Publication No. 2007-273440
Patent Document 3: Japanese Patent Laid-open Publication No. 2001-164245
Patent Document 4: Japanese Patent Laid-open Publication No. 2011-241160
Patent Document 5: Japanese Patent Laid-open Publication No. 2009-140822

SUMMARY OF THE INVENTION

The light source unit including a wavelength selective reflective film disclosed in Patent Document 5, however, has a problem that when it is mounted on a large display having a large area, during white display in the screen, luminance unevenness and color unevenness occur due to a slight difference in reflective characteristics in the reflective film, and a desired color cannot be displayed in actual image display.

The light source unit disclosed in Patent Document 5 also has a problem that when a light source having a narrow emission angle distribution of emitted light and having high vertical emission properties is used, a difference in the light emission behavior between light subjected to color conversion in the color conversion member and light from the light source changes the ratio among red, green, and blue light to cause color unevenness.

Under such circumstances, the present invention is intended to solve the above-mentioned problems, and an object of the present invention is to provide a light source unit that is capable of displaying an image of a desired color without causing luminance unevenness or color unevenness when mounted on a display.

The present invention according to exemplary embodiments is intended to solve the above-mentioned problems, and provides a light source unit including: a light source; a color conversion member that converts incident light incident from the light source into light having a longer wavelength than the incident light does; and a reflective film that is present between the light source and the color conversion member, transmits light incident from the light source, and reflects light exited from the color conversion member, wherein in the reflective film, the scattering angle (R2−R1) on at least one film surface is 5° or more, where the scattering angle is obtained from angles R1 and R2 (R1<R2) at which the transmitted light intensity is Tmax(0)/100 relative to the maximum transmitted light intensity of halogen light incident perpendicularly to the film surface of Tmax(0).

According to the present invention, it is possible to provide a light source unit that emits light with high luminance and that causes little color unevenness. Use of the light source unit according to the present invention in a display provides a display having high display performance with little color unevenness.

DETAILED DESCRIPTION OF EMBODIMENTS OF THE INVENTION

An embodiment of the present invention will be described in detail below, but the present invention is not construed as being limited to the embodiment including the following examples. Various modifications can be of course made without departing from the gist of the invention as long as the object of the invention can be achieved.

Figure 1:
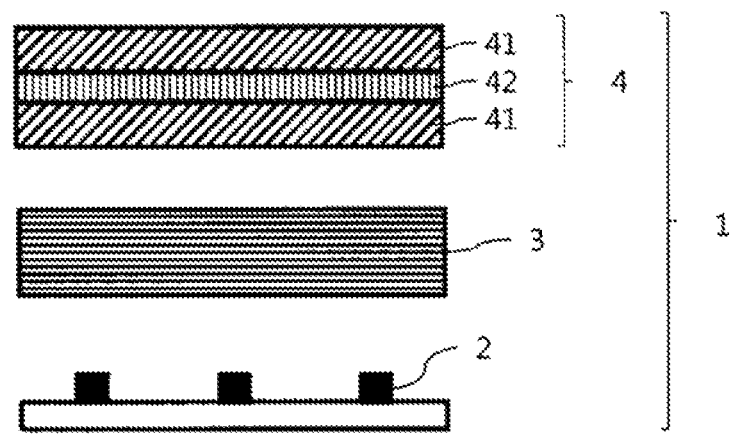
FIG. 1 is a schematic cross-sectional view showing an example of a light source unit according to an embodiment of the present invention.

As shown in FIG. 1, the light source unit according to an embodiment of the present invention includes a light source, a color conversion member, and a reflective film, and the reflective film needs to be present between the light source and the color conversion member. Hereinafter, configurations of these members will be described.

<Light Source>

The light source that constitutes the light source unit according to the present invention may be of any type as long as the light source emits light in a wavelength region in which the light can be absorbed by a light-emitting substance contained in the color conversion member described later. Examples of the light source include fluorescent light sources such as a hot-cathode tube, a cold-cathode tube, and an inorganic EL, organic electroluminescence element light sources, LEDs, incandescent light sources, and sunlight. Although any of the light sources mentioned above can be used in principle, LEDs are particularly suitable light sources. In display and illumination applications, for example, green light is emitted upon receipt of blue light, or blue light is emitted upon receipt of ultraviolet light. In the former case, a blue LED that is a light source having a wavelength in the range of 400 to 500 nm is a more suitable light source in that the blue LED can increase the color purity of blue light. In the latter case, a near-ultraviolet LED that is a light source having a wavelength in the range of 380 to 420 nm is a more suitable light source from the viewpoint of suppressing deterioration of internal materials due to ultraviolet rays while improving the blue light emission efficiency.

The light source may have one type of emission peak or two or more types of emission peaks, but the light source preferably has one type of emission peak in order to increase the color purity. It is also possible to use an arbitrary combination of a plurality of light sources with different types of emission peaks.

<Color Conversion Member>

The light source unit according to embodiments of the present invention needs to have a configuration including a color conversion member that converts incident light incident from the light source, that is, light from the light source incident on the color conversion member, into light having a longer wavelength than the incident light does. Herein, the wording "convert incident light incident from the light source into light having a longer wavelength than the incident light does" is defined as follows. First, the emission spectrum of the light source is measured, the wavelength at which the emission spectrum exhibits the maximum intensity is defined as the emission peak wavelength of the light source, and an emission band in which the light source exhibits an intensity of 50% or more of the emission intensity at the emission peak wavelength of the light source is defined as the emission band of the light source. Then, an emission spectrum of light that is from the light source and is received through the color conversion member is measured. In the measurement, the wavelength at which the emission spectrum exhibits the maximum intensity and which is out of the emission band of the light source is defined as the light exit peak wavelength of the color conversion member, and a band in which the color conversion member exhibits an intensity of 50% or more of the light exit intensity at the light exit peak wavelength of the color conversion member is defined as the light exit band of the color conversion member. When the light exit band of the color conversion member is on a longer wavelength side than the emission band of the light source, it means that incident light incident from the light source is converted into light having a longer wavelength than the incident light does. More specifically, the long wavelength end of the light exit band of the color conversion member is on a longer wavelength side than the long wavelength end of the emission band of the light source. Use of such a color conversion member provides a light source unit and a liquid crystal display with high color reproducibility. In addition, when there are a plurality of local light exit peaks from the color conversion member, the color conversion member may have a plurality of light exit bands. In this case as well, it is necessary that among the divided light exit bands of the color conversion member, the wavelength at the long wavelength end of the light exit band of the color conversion member at the longest wavelength side be on the longer wavelength side than the long wavelength end of the emission band of the light source. Further, in a more preferable combination of the light source and the color conversion member used in the present application, the low wavelength end of the light exit band of the color conversion member (the "low wavelength end" refers to the smallest wavelength in the band on the wavelength basis, and the "long wavelength end" refers to the largest wavelength in the same band) is on the longer wavelength side than the long wavelength end of the emission wavelength of the light source. In this case, since the color conversion member emits light of a color different from that of the light source, a display with higher color reproducibility can be obtained.

Figure 2:
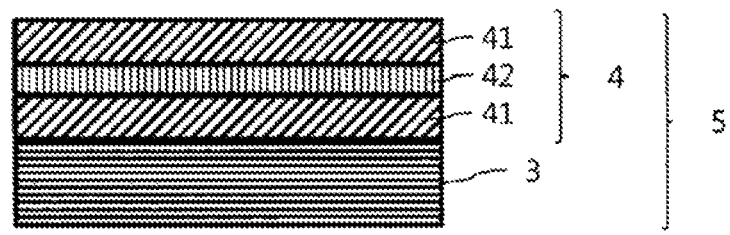
FIG. 2 is a schematic cross-sectional view showing an example of a color conversion member used in the light source unit according to an embodiment of the present invention.
Figure 3:
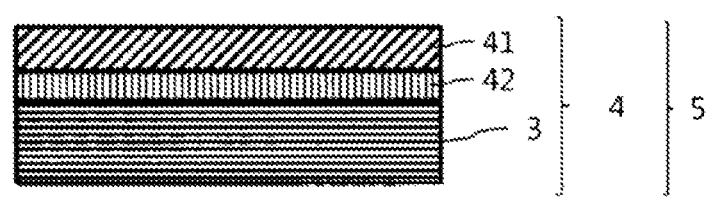
FIG. 3 is a schematic cross-sectional view showing an example of the color conversion member used in the light source unit according to an embodiment of the present invention.

As described above, the color conversion member that constitutes the light source unit according to embodiments of the present invention is a member that converts light of a specific wavelength into light of another wavelength. Examples of the color conversion member include a film or a sheet containing a color conversion material having a function of converting the light wavelength, such as quantum dots and phosphors. The color conversion member may also be a resin film containing a color conversion material, or a laminate of a film serving as a base material and a film containing a color conversion material laminated on the base material (see FIG. 2). The film serving as a base material may be a reflective film described later (see FIG. 3). Another example is use of the color conversion member as an alternative to a normal color filter composed of three colors of red, green, and blue. When a blue light source is used, a color conversion member for red, a color conversion member for green, and a transparent member that transmits blue light are respectively used as alternatives to the red, green, and blue color filters.

An example of quantum dots is CdSe having a ZnS shell. Alternatively, core/shell luminescent nanocrystals containing CdSe/ZnS, InP/ZnS, PbSe/PbS, CdSe/CdS, CdTe/CdS, or CdTe/ZnS may also be used.

The inorganic phosphor is not particularly limited as long as it can finally reproduce a predetermined color, and a known inorganic phosphor can be used. Examples of the inorganic phosphor include YAG phosphors, TAG phosphors, silicate phosphors, nitride phosphors, oxynitride phosphors, nitrides, oxynitride phosphors, and β-sialon phosphors. Of these, YAG phosphors and β-sialon phosphors are preferably used.

Examples of the YAG phosphor include yttrium-aluminum oxide phosphors activated with at least cerium, yttrium-gadolinium-aluminum oxide phosphors activated with at least cerium, yttrium-aluminum-garnet oxide phosphors activated with at least cerium, and yttrium-gallium-aluminum oxide phosphors activated with at least cerium. Specific examples of the YAG phosphor include $Ln_3M_5O_{12}$:R (wherein Ln is at least one element selected from Y, Gd, and La, M includes at least one of Al and Ca, and R is a lanthanoid) and $(Y_{1-x}Ga_x)_3(Al_{1-y}Ga_y)_5O_{12}$:R (wherein R is at least one element selected from Ce, Tb, Pr, Sm, Eu, Dy, and Ho, 0<x<0.5, and 0<y<0.5).

A β-sialon is a solid solution of β-silicon nitride, in which Al and O are substituted to form a solid solution at the Si position and the N position of the β-silicon nitride crystal, respectively. Since the β-sialon contains two formula masses of atoms in a unit cell (unit lattice), it is represented by the general formula $Si_{6-z}Al_zO_zN_{8-z}$. In the composition, z is 0 to 4.2, the solid solution range is very wide, and the molar ratio of (Si,Al)/(N,O) needs to be maintained at 3/4. A general method for producing a β-sialon is a method of adding, besides silicon nitride, silicon oxide and aluminum nitride, or aluminum oxide and aluminum nitride, and heating the resulting mixture.

A β-sialon, when incorporating a luminescent element such as rare earth elements (including Eu, Sr, Mn, and Ce) into the crystal structure, turns into a β-sialon phosphor that is excited by ultraviolet to blue light to emit green light having a wavelength in the range of 520 to 550 nm. The β-sialon phosphor is preferably used as a green light-emitting component of light-emitting devices such as white LEDs. In particular, a $Eu^{2+}$-activated β-sialon phosphor containing europium ($Eu^{2+}$) has a very sharp emission spectrum, and is therefore a material suitable for a backlight light source of image processing display devices or liquid crystal display panels for which blue, green, and red narrow-band light emission is required.

Examples of the organic phosphor include: fused aryl ring-containing compounds and derivatives thereof, such as naphthalene, anthracene, phenanthrene, pyrene, chrysene, naphthacene, triphenylene, perylene, fluoranthene, fluorene, and indene;

heteroaryl ring-containing compounds and derivatives thereof, such as furan, pyrrole, thiophene, silole, 9-silafluorene, 9,9'-spirobisilafluorene, benzothiophene, benzofuran, indole, dibenzothiophene, dibenzofuran, imidazopyridine, phenanthroline, pyridine, pyrazine, naphthyridine, quinoxaline, and pyrrolopyridine;

borane derivatives;

stilbene derivatives such as 1,4-distyrylbenzene, 4,4'-bis(2-(4-diphenylaminophenyl)ethenyl)biphenyl, and 4,4'-bis(N-(stilben-4-yl)-N-phenylamino)stilbene;

aromatic acetylene derivatives, tetraphenylbutadiene derivatives, aldazine derivatives, pyrromethene derivatives, and diketopyrrolo[3,4-c]pyrrole derivatives;

coumarin derivatives such as Coumarin 6, Coumarin 7, and Coumarin 153;

azole derivatives and metal complexes thereof, such as imidazole, triazole, thiadiazole, carbazole, oxazole, oxadiazole, and triazole;

cyanine compounds such as indocyanine green;

xanthene compounds and thioxanthene compounds such as fluorescein, eosin, and rhodamine;

polyphenylene compounds, naphthalimide derivatives, phthalocyanine derivatives and metal complexes thereof, and porphyrin derivatives and metal complexes thereof;

oxazine compounds such as Nile Red and Nile Blue;

helicene compounds;

aromatic amine derivatives such as N,N'-diphenyl-N,N'-di(3-methylphenyl)-4,4'-diphenyl-1,1'-diamine; and organometallic complex compounds such as iridium (Ir), ruthenium (Ru), rhodium (Rh), palladium (Pd), platinum (Pt), osmium (Os), and rhenium (Re).

It is only necessary that at least one color conversion material be contained in the color conversion member, but two or more color conversion materials may be contained in the color conversion member.

Herein, the "color conversion member" refers to a tangible object containing a substance having a color conversion function as a constituent. Examples of the color conversion member include a film-shaped member, which is the material having a color conversion function alone or a laminate of the material having a color conversion function on another material, and a member containing the material having a color conversion function fixed by printing or coating to a hard member typified by a glass member. Although the film is spread two dimensionally, the size of the spread does not affect the meaning of the film. For example, even a member having a thickness (in the z-axis direction) of 10 nm and an area of the x-y plane of 1 $\mu m^2$ can be referred to as a film.

<Reflective Film>

The reflective film that constitutes the light source unit according to embodiments of the present invention needs to be present between the light source and the color conversion member, and to transmit light incident from the light source. Herein, the wording "transmit light incident from the light source" means that in the transmission spectrum of the reflective film at an incident angle of 0°, the average transmittance in the emission band of the light source is 80% or more. Since the reflective film transmits light incident from the light source, a large amount of light that is incident from the light source reaches the color conversion member, and light emission from the color conversion member can be easily increased. The transmittance for incident light incident on the reflective film from the light source at an incident angle of 0° is more preferably 85% or more, still more preferably 90% or more. An increase in the transmittance makes it easy to increase the color conversion efficiency of the color conversion member more efficiently. In order to transmit light incident from the light source, in an aspect, the reflective film includes a band in which the transmittance at an incident angle of 0° is 80% or more over a continuous wavelength section of 50 nm in a wavelength range of 400 to 700 nm. When the reflective film has a band in which the transmittance is 80% or more over a continuous wavelength section of 50 nm so that the band may include at least part of the emission band of the light source, at the time the reflective film transmits light incident from the light source, a large amount of light that is incident from the light source reaches the color conversion member, and light emission from the color conversion member can be easily increased. Preferably, the band in which the transmittance at an incident angle of 0° is 80% or more in a wavelength range of 400 to 700 nm completely includes the emission band. In such a case, since light from the light source in an amount equal to the amount in the case without the reflective film reaches the color conversion member, light emission from the color conversion member is increased. Such a reflective film can be obtained by providing a layer made of a low refractive index resin on the surface to suppress the surface reflection, in addition to optimization of the reflection band by control of the layer thickness of each layer in the reflective film.

The reflective film that constitutes the light source unit according to embodiments of the present invention needs to reflect light exited from the color conversion member. Herein, the wording "reflect light exited from the color conversion member" means that in the reflection spectrum of the reflective film at an incident angle of 10° or 60°, the maximum reflectance in the light exit band of the color conversion member is 30% or more. One of the causes of a decrease in the luminance in a light source unit including a color conversion member containing a color conversion material is a loss of amount of light due to stray light generated by isotropic light emission from the color conversion member. In particular, a main cause of the loss of amount of light is that light exited from the color conversion member to the light source side strays in the light source unit. Providing, between the light source and the color conversion member, the reflective film that reflects light having been incident on the color conversion member from the light source and converted into light having a long wavelength as in exemplary embodiments of the present invention makes it possible to reflect light from the color conversion member directly under the color conversion member, and to easily suppress a decrease in the luminance due to stray light in a cavity on the light source side. In the reflection spectrum of the reflective film at an incident angle of 10° or 60°, the average reflectance in the light exit band of the color conversion member is preferably 30% or more, more preferably 50% or more, still more preferably 90% or more. As the average reflectance in the light exit band of the color conversion member is higher, the effect of converting light exited from the color conversion member to the light source side into light on the viewing side is enhanced, and a light source unit that emits light with higher luminance can be obtained. In order to reflect light exited from the color conversion member, the reflective film preferably has a reflection band having a bandwidth of 50 nm or more on the longer wavelength side than the transmission band. Herein, the "reflection band" of the reflective film refers to the following section in the reflection spectrum of the reflective film at an incident angle of 10°, which is obtained by the measurement method described later, and in which the maximum reflectance in a wavelength range of 400 to 1600 nm is defined as Rmax (%): a section between a low wavelength end and a long wavelength end of the reflection band of the reflective film, wherein the low wavelength end is a wavelength that is the lowest in the wavelengths at which the reflectance is RMax/2 (%) and is 400 nm or more, and the long wavelength end is a wavelength that is the longest in the wavelengths at which the reflectance is RMax/2 (%) and is 1600 nm or less. Providing the reflection band so that the band may include at least part of the light exit band of the color conversion member makes it possible to reflect light, which is exited from the color conversion member to the reflective film side, to the viewing side, and the luminance is easily increased. Preferably, the reflection band completely includes the light exit band of the color conversion member. In this case, substantially all the light exited from the color conversion member to the reflective film side can be reflected, and a high luminance improvement effect is obtained.

In the reflective film that constitutes the light source unit according to embodiments of the present invention, the scattering angle (R2−R1) on at least one film surface needs to be 5° or more, where the scattering angle is obtained from angles R1 and R2 (R1<R2) at which the transmitted light intensity is Tmax(0)/100 relative to the maximum transmitted light intensity of halogen light incident perpendicularly to the film surface of Tmax(0). Specifically, at the film surface, the scattering angle (R2−R1) obtained from the angles R1 and R2 (R1<R2) at which the transmitted light intensity is Tmax(0)/100 needs to be 5° or more. In the case of a transparent film, the emitted light is transmitted linearly, and therefore the scattering angle obtained from the angles R1 and R2 (R1<R2) at which the transmitted light intensity is Tmax(0)/100 is very narrow, that is, about 1°. Herein, when the scattering angle obtained from the angles R1 and R2 (R1<R2) at which the transmitted light intensity is Tmax(0)/100 is 5° or more, the light transmitted through and exited from the film can be moderately scattered, in-plane unevenness of the optical characteristics inherent to the film can be alleviated, and luminance unevenness and color unevenness when the film is mounted on a display can be suppressed. Preferably, the scattering angle on the film surface arranged on the light source side is 10° or more, where the scattering angle is obtained from the angles R1 and R2 (R1<R2) at which the transmitted light intensity is Tmax(0)/100 relative to the maximum transmitted light intensity of halogen light incident perpendicularly to the film surface of Tmax(0). As the scattering angle obtained from the angles R1 and R2 (R1<R2) at which the transmitted light intensity is Tmax(0)/100 is larger, the luminance unevenness and color unevenness themselves become less apparent. One method for obtaining such a reflective film is to add a scatterer containing an inorganic or organic substance having an appropriate size to the reflective film. Adding such particles to the reflective film causes the optical paths of light in the film to be mixed, and in-plane unevenness of the optical characteristics inherent to the film is suppressed. Although there is no particular limitation on the upper limit of the scattering angle obtained from the angles R1 and R2

(R1<R2) at which the transmitted light intensity is Tmax(0)/100, as will be described later, the scattering angle obtained from the angles R1 and R2 (R1<R2) at which the transmitted light intensity is Tmax(0)/100 is preferably 20° or less for the purpose of increasing the luminance of the display. Therefore, in a configuration in which the luminance is emphasized, from the viewpoint of achieving both the luminance and suppression of color unevenness, the scattering angle obtained from the angles R1 and R2 (R1<R2) at which the transmitted light intensity is Tmax(0)/100 is preferably 5° or more and 10° or less. In this case, it is easy to provide a high-quality display without unevenness while exhibiting excellent luminance characteristics by mounting the reflective film on the display. Moreover, when a light source having a narrow emission angle distribution of emitted light and having high vertical emission properties is used, color unevenness occurs due to the difference in the light emission behavior between light subjected to color conversion by the color conversion member and light from the light source. In this case, when the scattering angle obtained from the angles R1 and R2 (R1<R2) at which the transmitted light intensity is Tmax(0)/100 is 5° or more, the light from the light source is scattered so as to correspond to the spread of the light that is subjected to color conversion by the color conversion member and is emitted isotropically, so that the change in the ratio among red, green, and blue light is reduced, and color unevenness can be suppressed.

Similarly, it is also preferable in the reflective film that constitutes the light source unit according to the present invention that the scattering angle (R4−R3) on at least one film surface be 5° or more, where the scattering angle is obtained from angles R3 and R4 (R3<R4) at which the transmitted light intensity is Tmax(45)/100 relative to the maximum transmitted light intensity of halogen light incident at an angle of 45° to the film surface of Tmax(45), that is, the scattering angle on the film surface be 5° or more, where the scattering angle is obtained from the angles R3 and R4 (R3<R4) at which the transmitted light intensity is Tmax(45)/100. In particular, strongly scattering light that is emitted obliquely and has a large optical path can suppress the luminance unevenness and color unevenness when the film is mounted on a display more effectively. Preferably, the scattering angle on the film surface arranged on the light source side is 10° or more, where the scattering angle is obtained from the angles R3 and R4 (R3<R4) at which the transmitted light intensity is Tmax(45)/100 relative to the maximum transmitted light intensity of halogen light incident at an angle of 45° to the film surface of Tmax(45). In this case, luminance unevenness and color unevenness when the film is mounted on a display can be made almost invisible. Meanwhile, as will be described later, it is also preferable that the scattering angle obtained from the angles R1 and R2 (R1<R2) at which the transmitted light intensity is Tmax(0)/100 be 30° or less for the purpose of increasing the luminance of the display.

It is also preferable in the reflective film that constitutes the light source unit according to the present invention that the scattering angle (R6−R5) on at least one film surface be 3° or less, where the scattering angle is obtained from angles R5 and R6 (R5<R6) at which the transmitted light intensity is Tmax(0)/2 relative to the maximum transmitted light intensity of halogen light incident perpendicularly to the film surface of Tmax(0), that is, the scattering angle on the film surface be 3° or less, where the scattering angle is obtained from the angles R5 and R6 (R5<R6) at which the transmitted light intensity is Tmax(0)/2. As described above, when the scattering angle obtained from the angles R1 and R2 (R1<R2) at which the transmitted light intensity is Tmax(0)/100 is 5° or more, in-plane unevenness of the optical characteristics inherent to the film can be suppressed. Meanwhile, depending on the configuration of the display on which the reflective film is mounted, the amount of light that can be taken out in the front direction may decrease due to the scattering of light, and the luminance may decrease. Herein, when the scattering angle obtained from the angles R5 and R6 (R5<R6) at which the transmitted light intensity is Tmax(0)/2 is 3° or less, the light can be moderately scattered while the linear transmittivity for most of the light is maintained, and color unevenness and luminance unevenness can be suppressed while the luminance when the film is mounted on a display is maintained. The scattering angle obtained from the angles R5 and R6 (R5<R6) at which the transmitted light intensity is Tmax(0)/2 is preferably 2° or less. In order to achieve both a scattering angle obtained from the angles R1 and R2 (R1<R2) at which the transmitted light intensity is Tmax(0)/100 of 5° or more and a scattering angle obtained from the angles R5 and R6 (R5<R6) at which the transmitted light intensity is Tmax(0)/2 of 3° or less, it is required not only to adjust the amount of the scatterer contained in the film but also to adjust the size of the scatterer so that the scatterer is capable of selectively reflecting only the target light. In particular, when a combination of a light source that emits light of a specific emission wavelength and a color conversion member that converts incident light incident from the light source into light having a longer wavelength than the incident light does is used as in the light source unit according to embodiments of the present invention, it is effective for achieving both the maintenance of luminance and the luminance unevenness and color unevenness to scatter only the light exited from the color conversion member while suppressing scattering of incident light emitted from the light source. The degree of light scattering is determined by the size of the scatterer and the wavelength of the light, and a scatterer having a larger size can scatter light having a longer wavelength. For example, when a light source that emits blue light is used, the size of the scatterer for improving the scattering property of green and red light while suppressing the scattering property of blue light is preferably 1.5 μm or more and 10 μm or less, more preferably 2 μm or more and 5 μm or less. Similarly, as for examples of the content of the scatterer, the content is 0.05 to 3 wt % when particles having a dispersion diameter of 4 μm are used, and is 0.1 to 0.5 wt % when particles having a dispersion diameter of 2.5 μm are used. In this case, it is possible to easily achieve both the maintenance of luminance and the suppression of luminance unevenness and color unevenness. Further, the outermost layer of the reflective film preferably has a content of the scatterer of 0.1 wt % or less based on the outermost layer. The content is more preferably 0.05 wt % or less. If the outermost layer of the reflective film contains a large amount of the scatterer, the light scattering property is improved owing to irregularities generated on the film surface, but the scattering is mainly due to light scattering on the film surface. Therefore, the scatterer little contributes to the reflection performance of the reflective film, and has a small effect of remedying the in-plane unevenness of the optical characteristics inherent to the film. Alternatively, when an appropriate amount of the scatterer is contained in an inner layer (layer other than the outermost layer) while the amount of the scatterer contained in the outermost layer of the reflective film is kept not more than a certain level, it is possible to enhance the effect of remedying the in-plane unevenness of the optical characteristics inherent to the film while suppressing the scattering of light on the film surface. As a result, it is easy to achieve both a scattering angle obtained from the angles R1 and R2 (R1<R2) at which the transmitted light intensity is Tmax(0)/100 of 5° or more and a scattering angle obtained from the angles R5 and R6 (R5<R6) at which the transmitted light intensity is Tmax(0)/2 of 2° or less, and it is possible to achieve both a high luminance and suppression of color unevenness and luminance unevenness when the film is mounted on a display.

In the reflective film that constitutes the light source unit according to the present invention, it is also preferable that at least one film surface have an L*(SCI) value obtained by reflection measurement with a colorimeter of 60 or more, that is, the L*(SCI) value of the film surface be 60 or more. Herein, "L*(SCI)" is the intensity of light in all the directions of a reflector. As the value of L*(SCI) is larger, the light exited from the color conversion member can be reflected more efficiently, and as described above, the luminance when the film is mounted on a display can be improved more easily. Preferably, a film surface facing the color conversion member has an L*(SCI) value obtained by reflection measurement with a colorimeter of 60 or more. The L*(SCI) can be increased by increasing the reflectance in the light exit band of the color conversion member at an incident angle of 10°. However, depending on the scatterer added to the reflective film, the light may be transmitted backward due to the light scattering and the L*(SCI) may be consequently decreased. Therefore, the size of the scatterer needs to be optimized as described above, and the addition amount of the scatterer also needs to be controlled.

In the reflective film that constitutes the light source unit according to the present invention, it is also preferable that at least one film surface have an L*(SCE) value obtained by reflection measurement with a colorimeter of 30 or more, that is, the L*(SCE) value of the film surface be 30 or more. Herein, "L*(SCE)" is an index of the intensity of light excluding regular reflection (specular reflection) of a reflector, and indicates how light is scattered by the reflective film. In particular, optical unevenness of the reflective film is mainly caused by a shift of the reflection band or a shift of the reflectance when light in the emission band of the color conversion member is reflected. Therefore, when light exited from the color conversion member is scattered, the effect of suppressing luminance unevenness and color unevenness when the film is mounted on a display is remarkably exhibited. Preferably, a film surface facing the color conversion member has an L*(SCE) value obtained by reflection measurement with a colorimeter of 30 or more. Moreover, when a light source having a narrow emission angle distribution of emitted light and having high vertical emission properties is used, color unevenness occurs due to the difference in the light emission behavior between light subjected to color conversion by the color conversion member and light from the light source. In this case, when the L*(SCE) value is 30 or more, the light from the light source is scattered so as to correspond to the spread of the light that is subjected to color conversion by the color conversion member and is emitted isotropically, so that the change in the ratio among red, green, and blue light is reduced, and color unevenness can be suppressed.

More preferably, at least one film surface of the reflective film has an L*(SCI)/L*(SCE) value obtained by reflection measurement with a colorimeter of 2.5 or less, that is, the L*(SCI)/L*(SCE) value of the film surface is 2.5 or less. When the L*(SCI)/L*(SCE) value is 2.5 or less, most of the reflected light is scattered, so that the effect of suppressing luminance unevenness and color unevenness when the film is mounted on a display is remarkably exhibited. In order to achieve an L*(SCI)/L*(SCE) value of 2.5 or less, the size of the scatterer is controlled as described above. For example, the size of the scatterer when a light source that emits blue light is used is preferably 1.5 µm or more, more preferably 2 µm or more. Further, the outermost layer of the reflective film preferably has a content of the scatterer of 0.1 wt % or less based on the outermost layer. The effect of the content of the scatterer is as described above.

The reflective film that constitutes the light source unit according to the present invention preferably has a haze value of 2% or more. In this case, it is easy to achieve a scattering angle obtained from the angles R1 and R2 (R1<R2) at which the transmitted light intensity is Tmax (0)/100 of 5° or more, a scattering angle obtained from the angles R3 and R4 (R3<R4) at which the transmitted light intensity is Tmax(45)/100 of 5° or more, and an L*(SCE) value of 30 or more. The haze value is more preferably 5% or more, still more preferably 10% or more. As the haze increases, the effect of suppressing luminance unevenness and color unevenness when the film is mounted on a display is easily obtained. Meanwhile, the haze value is preferably 20% or less. As the haze increases, the scattering of the light incident on the reflective film can be increased. However, the light extraction efficiency in the front direction when the film is mounted on a display decreases, so that the luminance may decrease depending on the configuration of the display. Setting the haze value to 20% or less makes it easy to satisfy a scattering angle obtained from the angles R5 and R6 (R5<R6) at which the transmitted light intensity is Tmax (0)/2 of 3° or less and an L*(SCI) value of 60 or more. As a result, it is possible to easily achieve luminance improvement and suppression of luminance unevenness and color unevenness when the film is mounted on a display.

Figure 8:
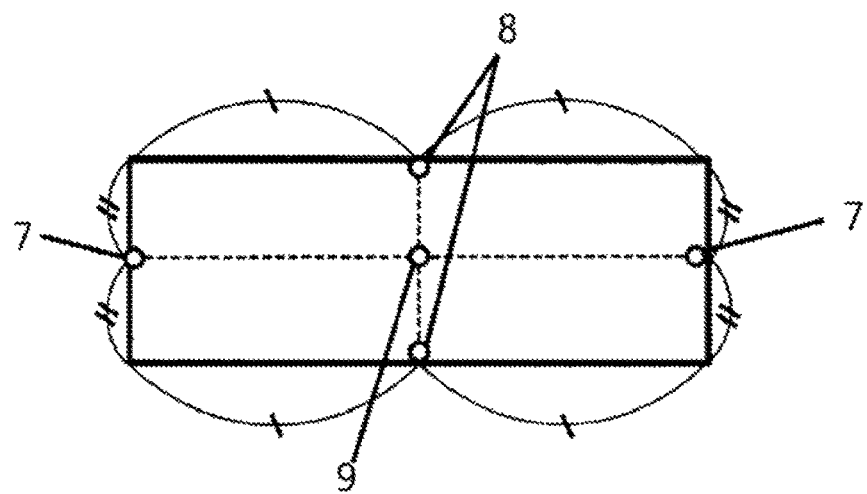
FIG. 8 is a schematic view showing positions of long direction ends, short direction ends, and center of a reflective film according to an embodiment of the present invention.

In the reflective film that constitutes the light source unit according to the present invention, it is also preferable that the difference between the maximum value and the minimum value of low wavelength ends of reflection bands at three points including the center and both ends in the long direction, or the difference between the maximum value and the minimum value of low wavelength ends of reflection bands at three points including the center and both ends in the short direction be 40 nm or less. As used herein, "both ends in the long direction" represent both ends in the long direction at the midpoint of the short side as shown in FIG. 8, and "both ends in the short direction" represent both ends in the short direction at the midpoint of the long side as shown in FIG. 8. Moreover, as for the "long direction" of the reflective film, when the light source unit has a substantially quadrangular shape, the long side direction of the quadrangle is the long direction, and the short side direction of the quadrangle is the short side direction. In the case where the light source unit does not have a substantially quadrangular shape, the long direction is defined as a direction of the longest diagonal line that passes through the center of gravity, and the short direction is defined as a direction orthogonal to the diagonal line. In this case, the wording "both ends in the long direction" represents both the ends in the long direction defined above, and the wording "both ends in the short direction" represents both the ends in the short direction defined above. As described above, in the reflective film that can satisfy the conditions of transmitting the light incident from the light source and reflecting the light exited from the color conversion member, the low wavelength end of the reflection band of the reflective film is substantially provided near the emission band of the light source or near the light exit band of the color conversion member. Since these bands are very sensitive to color, if the position of the low wavelength end of the reflection band of the reflective film is shifted, the color tone or luminance may change when the reflective film is used in a light source unit or a display including the light source unit. Therefore, in the reflective film, when the difference between the maximum value and the minimum value of low wavelength ends of reflection bands at three points including the center and both ends in the long direction, or the difference between the maximum value and the minimum value of low wavelength ends of reflection bands at three points including the center and both ends in the short direction is 40 nm or less, the color tone and luminance of the light source unit are uniformized, and the obtained light source unit or display is free from unevenness. The difference between the maximum value and the minimum value of low wavelength ends of reflection bands at three points including the center and both the ends is preferably 30 nm or less. The smaller the difference is, the better the uniformity of color tone and luminance is. Examples of a method for obtaining such a reflective film include a method of increasing the transverse draw ratio in producing the reflective film, and when the reflective film is a laminated film described later, a method of setting the thickness of the outermost layer to 3% or more of the thickness of the reflective film. When such a method is employed, the uniformity of the reflection bands in the width direction orthogonal to the flow direction during film production can be improved.

In addition, in the reflective film, it is also preferable that both the difference between the maximum value and the minimum value of low wavelength ends of reflection bands at three points including the center and both ends in the long direction, and the difference between the maximum value and the minimum value of low wavelength ends of reflection bands at three points including the center and both ends in the short direction be 40 nm or less. When the low wavelength ends of the reflection bands in both the long direction and the short direction are unified, the color tone and luminance are uniformized when the reflective film is used in a light source unit or a display, and there is no unevenness in the entire plane.

More preferably, the difference among low wavelength ends of reflection bands at three points that are continuously present at an interval of 10 cm in the long direction and the short direction of the reflective film is 30 nm or less. In a display including a light source unit including the reflective film mounted thereon, even if the reflective film has a shift of the reflection band, the shift is hardly visible when the reflection band gradually shifts from position to position because the color changes little by little. On the other hand, if the reflective film has a region in which the reflection band is suddenly shifted in some position, changes in luminance and color in adjacent sections tend to be easily visible. Therefore, when the difference among low wavelength ends of reflection bands at three points that are continuously present at an interval of 10 cm is 30 nm or less, the color change is small, and the color change when a light source unit including the reflective film is mounted on a display is hardly recognized. More preferably, the difference among low wavelength ends of reflection bands at three points that are continuously present at an interval of 10 cm in the long direction and the short direction is 20 nm or less. In this case, the color change when a light source unit including the reflective film is mounted on a display is at a hardly recognizable level.

In addition, in the reflective film, it is also preferable that both the difference between the maximum value and the minimum value of the average reflectances in reflection bands at three points including the center and both ends in the long direction, and the difference between the maximum value and the minimum value of the average reflectances in reflection bands at three points including the center and both ends in the short direction be 10% or less. Herein, the "average reflectance in the reflection band" is the average reflectance in the reflection band determined as described above. Factors that contribute to the color tone and luminance include unevenness of the reflectance in the reflection bands in addition to the positions of the low wavelength ends of the reflection bands of the reflective film described above. Herein, as the average reflectances in the reflection bands are more uniform, it is particularly easier to provide a uniform light source unit and a uniform display including the light source unit that are free from luminance unevenness. The difference between the maximum value and the minimum value of the average reflectances in the reflection bands is preferably 5% or less, more preferably 3% or less. As the difference in the average reflectances is smaller, a light source unit having uniform color tone and luminance and a display including the light source unit tend to be obtained. Examples of a method for obtaining such a reflective film include a method of increasing the transverse draw ratio in producing the reflective film, and when the reflective film is a laminated film described later, a method of setting the thickness of the outermost layer to 3% or more of the thickness of the reflective film. When such a method is employed, the uniformity of the reflection bands in the width direction orthogonal to the flow direction during film production can be improved. Further, it is possible to suppress the variation in the reflectance by increasing the average reflectances in the reflection bands.

Further, it is also preferable that the minimum value of the correlation coefficients obtained from the reflectance at the center of the reflective film in a wavelength range of 400 to 800 nm and the reflectances at four points of the reflective film including both ends in the long direction and both ends in the short direction of the reflective film in a wavelength range of 400 to 800 nm be 0.8 or more. Herein, the "correlation coefficient" refers to a correlation coefficient among the value obtained by measuring the reflectance at the center of the film in a wavelength range of 400 to 800 nm at every 1 nm and the values obtained by measuring the reflectances at ends of the film in a wavelength range of 400 to 800 nm at every 1 nm. The higher the value of the correlation coefficient is, the narrower the distribution of the reflectances is. When the reflectances are exactly the same, the value of the correlation coefficient is 1. The wording "the minimum value of the correlation coefficient is 0.8 or more" means that the smallest correlation coefficient among four correlation coefficients that are obtained from the reflectance at the center of the film in a wavelength range of 400 to 800 nm and the reflectances at four points of the reflective film including both ends in the long direction and both ends in the short direction of the reflective film in a wavelength range of 400 to 800 nm is 0.8 or more. In the above description, discussions have been made on the uniformization of color tone and luminance with reference to the low wavelength ends of reflection bands and the average reflectances in the reflection bands of the reflective film. Since the correlation coefficient includes both the elements and is an index indicating the uniformity of the reflection waveform, when the correlation coefficient is 0.8 or more, the reflective film is excellent in uniformity of both the color tone and luminance, and a light source unit and a display including the reflective film can also be free of color tone unevenness and luminance unevenness. The correlation coefficient is preferably 0.9 or more, more preferably 0.95 or more. When the correlation coefficient is 0.95 or more, it is possible to make the color tone unevenness and luminance unevenness in the light source unit and the display on which the reflective film is mounted hardly recognizable. Examples of a method for obtaining such a reflective film include a method of increasing the transverse draw ratio in producing the reflective film, and when the reflective film is a laminated film described later, a method of setting the thickness of the outermost layer to 3% or more of the thickness of the reflective film. In particular, setting the thickness of the outermost layer to 5% or more of the thickness of the reflective film can provide a correlation coefficient of 0.95 or more.

In the light source unit according to the present invention, it is preferable that the low wavelength end of the reflection band of the reflective film at an incident angle of 10° be larger than the emission wavelength of the light source and smaller than the light exit wavelength of the color conversion member. Herein, the wording "the low wavelength end of the reflection band of the reflective film is larger than the emission wavelength of the light source" means that the low wavelength end of the reflection band of the reflective film is on the longer wavelength side than the long wavelength end of the emission band of the light source. Moreover, the wording "the low wavelength end of the reflective film is smaller than the light exit wavelength of the color conversion member" means that the low wavelength end of the reflection band of the reflective film is on the lower wavelength side than the low wavelength end of the light exit band of the color conversion member. For example, in mobile displays, the luminance when the display is viewed from the front side is important depending on the design of the light source unit or the method of use of the display including the light source unit. In this case, when the low wavelength end of the reflective film is larger than the emission wavelength of the light source and smaller than the light exit wavelength of the color conversion member, it becomes easy to efficiently reflect light exited from the color conversion member in the front direction with the reflective film, and a high front luminance improvement effect is obtained.

In the light source unit according to the present invention, it is also preferable that the low wavelength end of the reflection band of the reflective film at an incident angle of 10° be included in the light exit band of the color conversion member. Herein, the wording "the low wavelength end of the reflective film is included in the light exit band of the color conversion member" means that the low wavelength end of the reflection band of the reflective film is on the longer wavelength side than the low wavelength end of the light exit band of the color conversion member. In particular, when it is required that the display look uniform from various viewing angles as in a display in an exhibition hall, the color tone and luminance when the display is viewed not from the front side but obliquely are important. Herein, when the low wavelength end of the reflective film is included in the light exit band of the color conversion member, the emission band of the color conversion member can be covered by the low-wavelength shift in the reflective film in the display viewed obliquely, and it becomes easy to provide a light source unit and a display excellent in color tone and luminance. It is more preferable that the low wavelength end of the reflection band of the reflective film at an incident angle of 10° be on the longer wavelength side than the low wavelength end of the light exit band of the color conversion member, and be on the lower wavelength side than any light exit peak wavelength of the color conversion member. In this case, it is possible to provide a reflective film excellent in the balance of the color tone and luminance between when the display is viewed from the front side and when the display is viewed obliquely, and the reflective film exhibits excellent performance in light source units and displays of various designs.

The reflective film used in the light source unit according to the present invention preferably satisfies the following formula (1). The following formula (1) shows that the change in the reflectance between the wavelength band in which light is reflected and the wavelength band in which light is transmitted is abrupt, and the smaller the value of $|\lambda 1 - \lambda 2|$ is, the more abrupt the change is from the wavelength band in which light is reflected to the wavelength band in which light is transmitted. When the change in the reflectance from the wavelength band in which light is reflected to the wavelength band in which light is transmitted, that is, the change in the reflectance from the emission band of the light source to the light exit band of the color conversion member is abrupt as described above, light exited from the color conversion member can be efficiently reflected while only the light from the light source is selectively and efficiently transmitted, and the effect of the reflective film can be easily obtained to a maximum extent. The value of $|\lambda 1 - \lambda 2|$ is more preferably 30 nm or less. The smaller the value of $|\lambda 1 - \lambda 2|$ is, the more the luminance improvement effect and the color tone uniformity are improved.

$$|\lambda 1 - \lambda 2| \leq 50 \text{ (where } \lambda 1 < \lambda 2) \tag{1}$$

Figure 4:
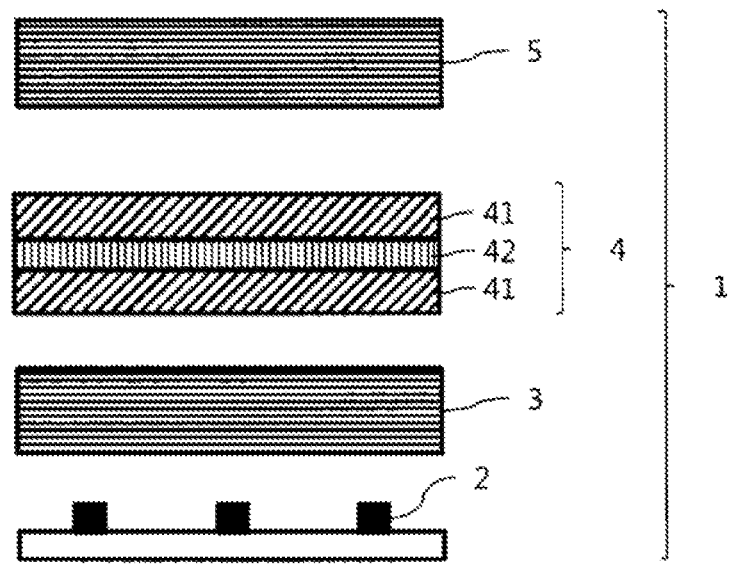
FIG. 4 is a schematic cross-sectional view showing an example of the light source unit according to an embodiment of the present invention.

$\lambda 1$: a wavelength (nm) at which the reflectance is ¼ of the maximum reflectance near the low wavelength end of the reflection band of the reflective film $\lambda 2$: a wavelength (nm) at which the reflectance is ¾ of the maximum reflectance near the low wavelength end of the reflection band of the reflective film In the light source unit according to the present invention, it is also preferable that the light source unit further include a second reflective film on a side of the color conversion member opposite to the light source side, that the second reflective film have an average reflectance in the emission band of the light source of 30% or more and 80% or less, and that the second reflective film have an average transmittance in the light exit band of the color conversion member of 80% or more. An example of the configuration is shown in FIG. 4. Although light emitted from the light source is partially converted into light having a long wavelength by the color conversion member, the rest of the light is transmitted through the color conversion member and emitted directly to the viewing side. However, when the light from the light source that has been transmitted through the color conversion member is reflected again and returned to the color conversion member, the light is converted into light having a long wavelength again by the color conversion member. As a result, light from the light source can be efficiently converted into light having a long wavelength with a small amount of the color conversion member, and the amount of expensive color conversion material can be reduced. Thus, the manufacturing cost of the color conversion member can be reduced. Moreover, since 80% or more of light exited from the color conversion member is transmitted, light exited from the color conversion member can be efficiently transmitted to the viewing side. Therefore, the luminance is not decreased while the conversion efficiency is increased, and a light source unit excellent in terms of color tone, luminance, and cost can be obtained.

The reflective film that constitutes the light source unit according to the present invention preferably contains a thermoplastic resin. Thermoplastic resins are generally less expensive than thermosetting resins and photocurable resins, and can be easily and continuously made into a sheet by known melt extrusion. Therefore, a reflective film can be obtained at low cost.

The reflective film that constitutes the light source unit according to the present invention is preferably an alternate laminate of 11 or more layers containing a plurality of different thermoplastic resins. Herein, the wording "the thermoplastic resins are different" means that the reflective film has refractive indices that are different by 0.01 or more in any of two orthogonal directions arbitrarily selected in the plane of the film and a direction perpendicular to the plane. Further, the wording "alternate laminate" as used herein means that layers containing different thermoplastic resins are laminated in a regular arrangement in the thickness direction. When the layers each contain a thermoplastic resin A or B and each layer is expressed as a layer A or a layer B, the layers are laminated as in A(BA)n (wherein n is a natural number). Alternately laminating resins having different optical properties in this manner makes it possible to exhibit interference reflection, by which it is possible to reflect light having a designed wavelength owing to the relationship between the refractive index difference among the layers and the layer thicknesses. When the number of layers to be laminated is 10 or less, high reflectance is not obtained in a band in which high reflectance is desired. Further, owing to the interference reflection described above, the larger the number of layers is, the wider the wavelength band in which a high reflectance for light can be achieved, and a reflective film that reflects light in a band in which high reflectance is desired can be obtained. The number of layers is preferably 100 or more, more preferably 200 or more. The number of layers is still more preferably 600 or more. In addition, although there is no upper limit on the number of layers, realistically speaking, a practical number of layers is about 10,000. This is because the larger the number of layers is, the more the manufacturing cost increases due to an increase in the size of the manufacturing apparatus, and the larger the film thickness is, so that the handling property is deteriorated.

In the present invention, it is also preferable to use a laminated member including the color conversion member that converts incident light incident from the light source into light having a longer wavelength than the incident light does, and the reflective film that transmits light incident from the light source and reflects light exited from the color conversion member. Herein, the wording "laminated member including the color conversion member and the reflective film" means that the color conversion member and the reflective film are fixed to each other either directly or with an adhesive layer or the like interposed between the color conversion member and the reflective film. In this case, since there is no space between the color conversion member and the reflective film, the loss of light due to stray light is suppressed and the reflection between the reflective film and the air on the surface of the color conversion member is eliminated, and thus the luminance improvement effect is remarkably exhibited.

In a more preferable form, a layer containing a color conversion material is directly provided on the reflective film to make the reflective film part of the color conversion member. In this case, the reflective film can take over the role of the base material used in forming the color conversion member, which leads to cost reduction. In addition, since the space between the color conversion material and the reflective film in the color conversion member is eliminated, the effect of suppressing the loss of light due to stray light is remarkably exhibited.

Figure 5:
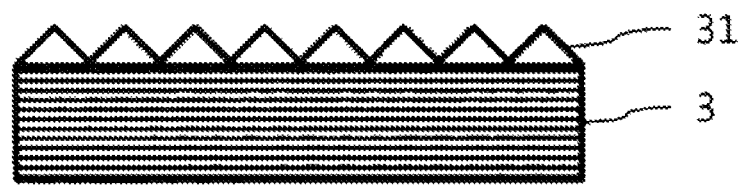
FIG. 5 is a schematic cross-sectional view showing an example of an irregular shape on a surface of a laminated film according to an embodiment of the present invention.
Figure 6:
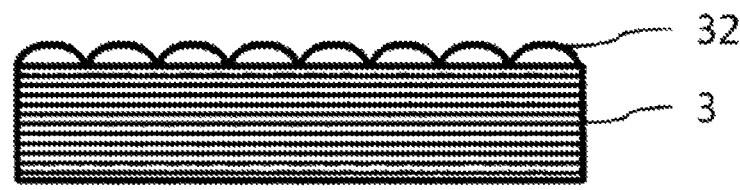
FIG. 6 is a schematic cross-sectional view showing an example of the irregular shape on the surface of the laminated film according to an embodiment of the present invention.

The reflective film or the color conversion member that constitutes the light source unit according to the present invention preferably has an irregular shape on a surface thereof. Herein, the "irregular shape" refers to a shape having a maximum height of 1 μm or more in the measurement of the shape of the film surface or interface. Examples of such irregularities are shown in FIGS. 5 and 6. In addition, effects of providing the irregular shape on the surface of the reflective film or the color conversion member will be described below.

The first effect is slipperiness. Since the irregular shape on the surface exhibits slipperiness, it is possible to suppress the occurrence of scratches when the reflective film and the color conversion member are incorporated in the light source unit.

The second effect is light extraction. The present inventors found a phenomenon that occurs in a color conversion member containing a color conversion material, that is, a phenomenon that light is confined in a sheet as in an optical fiber due to reflection of light in the color conversion member, and as a result, the luminance is decreased although the color conversion material itself has high light emission efficiency. As a countermeasure for the phenomenon, providing the irregular shape on the surface of the reflective film or the color conversion member enables light extraction from the irregular interface, so that the light taken into the color conversion member can be reduced, and the luminance improvement effect can be obtained. In order to obtain the second effect efficiently, the irregular shape preferably has a maximum height of 10 μm or more. The larger the irregular shape is, the more the light extraction efficiency is improved, and a better effect of suppressing unevenness of the light source can be obtained. In order to obtain the effect more efficiently, it is preferable to directly provide a layer containing a color conversion material on the reflective film to make the reflective film part of the color conversion member, and to provide the irregular shape on the surface of the color reflective film on the side of the layer containing the color conversion material. In this case, it is possible to extract light efficiently, and also to reflect the light to the display side efficiently, so that the luminance improvement effect is remarkably exhibited.

The third effect is adjustment of the optical path of light. While light from the light source, especially a light-emitting diode travels with relatively high directivity to the display side, light from the color conversion member emits isotropically, so that the luminance at the front of the light source is decreased. When the irregular shape is provided on the surface of the reflective film or the color conversion member, it is easy to adjust the direction of light at the irregular interface and to improve the luminance particularly by condensing light in the front direction. Moreover, since other optical members can be omitted when forming a light source unit or a display, the irregular shape also contributes to cost reduction.

In order to obtain the second and third effects more efficiently, it is preferable that the irregular shape be a lens shape, a substantially triangular shape, or a substantially semicircular shape. A microlens shape means substantially hemispherical irregularities, and a prism shape means substantially triangular irregularities. When the reflective film or the color conversion member has such a shape, the optical path of light is condensed on the display side, so that the front luminance of a light source unit or a display including the reflective film or the color conversion member is more remarkably improved.

Figure 7:
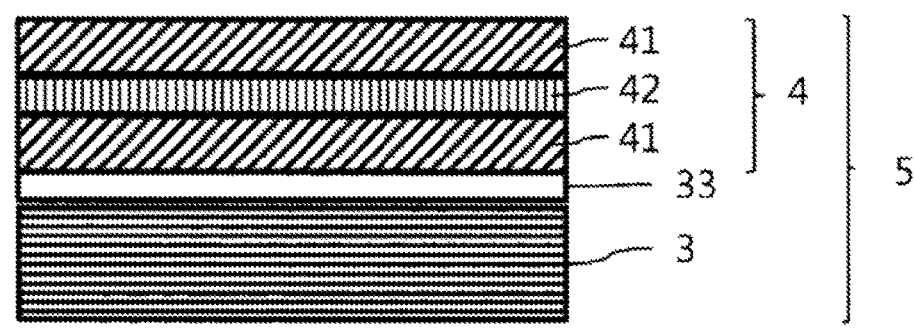
FIG. 7 is a schematic cross-sectional view showing an example of a laminated member according to an embodiment of the present invention.

As shown in FIG. 7, the laminated member or the light source unit according to an embodiment of the present invention has a functional layer on the surface of the reflective film or the color conversion member that constitutes the laminated member or the light source unit. Under the definition that the refractive index of the reflective film is n1, the refractive index of the color conversion member is n2, and the refractive index of the functional layer is n3, the refractive index n3 of the functional layer is preferably between n1 and n2. Herein, the refractive indices of the reflective film and the color conversion member refer to in-plane average refractive indices of layers that are outermost layers of the reflective film and the color conversion member, respectively. In this case, due to the effect of the refractive index of the functional layer, it is possible to suppress the reflection between the reflective film and the color conversion member, which are conventionally different in the refractive index, and the light from the light source is efficiently transmitted, so that the luminance can be easily improved.

The reflective film that constitutes the light source unit according to the present invention can contain chain polyolefins such as polyethylene, polypropylene, poly(4-methylpentene-1), and polyacetal, alicyclic polyolefins that are produced from norbornene by ring-opening metathesis polymerization, addition polymerization, or addition copolymerization with other olefins, biodegradable polymers such as polylactic acid and polybutyl succinate, polyamides such as nylon 6, nylon 11, nylon 12, and nylon 66, aramid, polymethyl methacrylate, polyvinyl chloride, polyvinylidene chloride, polyvinyl alcohol, polyvinyl butyral, an ethylene-vinyl acetate copolymer, polyacetal, polyglycolic acid, polystyrene, styrene-copolymerized polymethyl methacrylate, polyesters such as polycarbonate, polypropylene terephthalate, polyethylene terephthalate, polybutylene terephthalate, and polyethylene-2,6-naphthalate, polyethersulfone, polyetheretherketone, modified polyphenylene ether, polyphenylene sulfide, polyetherimide, polyimide, polyarylate, a tetrafluoroethylene resin, a trifluoroethylene resin, a trifluorochloroethylene resin, a tetrafluoroethylene-hexafluoropropylene copolymer, and polyvinylidene fluoride. Of these, a polyester is particularly preferably used from the viewpoint of strength, heat resistance, transparency, and versatility. These compounds may be a copolymer or a mixture of two or more resins.

The polyester is preferably a polyester obtained by polymerization from a monomer mainly containing an aromatic dicarboxylic acid or an aliphatic dicarboxylic acid and a diol. Examples of the aromatic dicarboxylic acid include terephthalic acid, isophthalic acid, phthalic acid, 1,4-naphthalenedicarboxylic acid, 1,5-naphthalenedicarboxylic acid, 2,6-naphthalenedicarboxylic acid, 4,4'-diphenyldicarboxylic acid, 4,4'-diphenylether dicarboxylic acid, and 4,4'-diphenylsulfone dicarboxylic acid. Examples of the aliphatic dicarboxylic acid include adipic acid, suberic acid, sebacic acid, dimer acid, dodecanedioic acid, cyclohexanedicarboxylic acid, and ester derivatives thereof. Of these, terephthalic acid and 2,6-naphthalenedicarboxylic acid that exhibit a high refractive index are preferable. These acid components may be used alone or in combination of two or more. Furthermore, oxyacids such as hydroxybenzoic acid may be partially copolymerized.

Examples of the diol component include ethylene glycol, 1,2-propanediol, 1,3-propanediol, neopentyl glycol, 1,3-butanediol, 1,4-butanediol, 1,5-pentanediol, 1,6-hexanediol, 1,2-cyclohexanedimethanol, 1,3-cyclohexanedimethanol, 1,4-cyclohexanedimethanol, diethylene glycol, triethylene glycol, polyalkylene glycol, 2,2-bis(4-hydroxyethoxyphenyl)propane, isosorbate, and spiroglycol. Of these, ethylene glycol is preferably used. These diol components may be used alone or in combination of two or more.

In the reflective film that constitutes the light source unit according to an embodiment of the present invention, the thermoplastic resin selected from the above-mentioned polyesters is, for example, preferably polyethylene terephthalate or a polymer thereof, polyethylene naphthalate or a copolymer thereof, polybutylene terephthalate or a copolymer thereof, polybutylene naphthalate or a copolymer thereof, polyhexamethylene terephthalate or a copolymer thereof, or polyhexamethylene naphthalate or a copolymer thereof.

When the reflective film that constitutes the light source unit according to exemplary embodiments of the present invention has a configuration including an alternate laminate of the layer A containing the thermoplastic resin A and the layer B containing the thermoplastic resin B, the difference in the in-plane average refractive index between the layer A containing the thermoplastic resin A and the layer B containing the thermoplastic resin B is preferably 0.03 or more. The difference in the in-plane average refractive index is more preferably 0.05 or more, still more preferably 0.1 or more. If the difference in the in-plane average refractive index is smaller than 0.03, sufficient reflectance is not obtained, and the luminance improvement performance may be insufficient. A method for achieving the above-mentioned difference in the in-plane average refractive index is use of a crystalline resin as the thermoplastic resin A and an amorphous resin as the thermoplastic resin B. In this case, it is possible to easily provide a refractive index difference in the stretching and heat treatment steps in the production of the reflective film.

In the reflective film that constitutes the light source unit according to the present invention, as for a preferable combination of the thermoplastic resin A and the thermoplastic resin B, first of all, it is preferable that the absolute value of the difference in the solubility parameter (SP value) between the thermoplastic resins be 1.0 or less. When the absolute value of the difference in the SP value is 1.0 or less, delamination hardly occurs. More preferably, the thermoplastic resin A and the thermoplastic resin B used in combination have the same basic skeleton. Herein, the "basic skeleton" refers to a repeating unit that constitutes a resin. For example, when polyethylene terephthalate is used as the thermoplastic resin A, the thermoplastic resin B contained is preferably ethylene terephthalate that has the same basic skeleton as that of polyethylene terephthalate from the viewpoint that the thermoplastic resin B is capable of easily realizing a highly precise lamination structure. When the thermoplastic resin A and the thermoplastic resin B are resins including the same basic skeleton, the precision of lamination is high, and delamination at the lamination interface is less likely to occur. Herein, the solubility parameter (SP value) is calculated from the types and the ratio of monomers that constitute the resin using the commonly used Fedors' estimation method described in, for example, Poly. Eng. Sci., vol. 14, No. 2, pp. 147-154 (1974). The solubility parameter of a mixture of a plurality of types of resins can also be calculated by a similar method. For example, the SP values of polymethyl methacrylate, polyethylene terephthalate (PET), and bisphenol A epoxy resin can be calculated as 9.5 $(cal/cm_3)^{0.5}$, 10.7 $(cal/cm_3)^{0.5}$, and 10.9 $(cal/cm_3)^{0.5}$, respectively.

In the reflective film that constitutes the light source unit according to the present invention, a preferable combination of the thermoplastic resin A and the thermoplastic resin B is a combination of thermoplastic resins having a difference in the glass transition temperature of 20° C. or less. If the difference in the glass transition temperature is larger than 20° C., the thickness uniformity in the formed reflective film may be poor, resulting in luminance unevenness and color tone unevenness, or air bubbles or wrinkles may be generated when the reflective film is bonded to the color conversion member. It is also preferable that the thermoplastic resin A be crystalline, the thermoplastic resin B be amorphous, and the glass transition temperature of the thermoplastic resin A be lower than the glass transition temperature of the thermoplastic resin B. In this case, when the reflective film is stretched at a stretching temperature appropriate for orienting and crystallizing the crystalline resin, the orientation of the amorphous resin can be suppressed compared to the orientation of the crystalline resin, and a refractive index difference can be easily provided. Herein, the "crystalline resin" specifically refers to a resin having an enthalpy of fusion (ΔHm) of 15 J/g or more, wherein the enthalpy of fusion is determined in differential scanning calorimetry (hereinafter sometimes referred to as DSC) according to JIS K7122 (1999) by heating the resin from 25° C. to 300° C. at a heating rate of 20° C./min (1st RUN), holding the resin in the same state for 5 minutes, then rapidly cooling the resin to a temperature of 25° C. or lower, again heating the resin from 25° C. to 300° C. at a heating rate of 20° C./min, and determining the enthalpy of fusion from the peak area of the melting peak in the differential scanning calorimetry chart of the 2nd RUN. The "amorphous resin" refers to a resin having an enthalpy of fusion (ΔHm) determined under the same conditions as described above of 5 J/g or less.

In an example of the combination of thermoplastic resins for satisfying the above-mentioned conditions, in the reflective film that constitutes the light source unit according to the present invention, it is preferable that the thermoplastic resin A contain polyethylene terephthalate or polyethylene naphthalate, and the thermoplastic resin B be a polyester containing a spiroglycol-derived polyester. The "spiroglycol-derived polyester" is a polyester containing spiroglycol as a diol component, and refers to a copolymer with another ester structural unit, a polyester containing spiroglycol as a single diol component, or a polyester that is a blend of the above-mentioned components with another polyester resin and in which spiroglycol residues preferably occupy half or more of all the diol residues in the polyester resin. The spiroglycol-derived polyester is preferable because it has a small glass transition temperature difference from polyethylene terephthalate or polyethylene naphthalate, and thus is not easily overstretched during film formation and is also difficult to delaminate. More preferably, the thermoplastic resin A contains polyethylene terephthalate or polyethylene naphthalate, and the thermoplastic resin B is a polyester containing spiroglycol and cyclohexanedicarboxylic acid. When the thermoplastic resin B is a polyester containing spiroglycol and cyclohexanedicarboxylic acid, the difference in the in-plane refractive index from polyethylene terephthalate or polyethylene naphthalate is large, so that high reflectance is easily obtained. Moreover, a polyester containing spiroglycol and cyclohexanedicarboxylic acid has a small glass transition temperature difference from polyethylene terephthalate or polyethylene naphthalate and is excellent in adhesiveness, and thus is not easily overstretched during film formation and is also difficult to delaminate.

In the reflective film that constitutes the light source unit according to the present invention, it is also preferable that the thermoplastic resin A contain polyethylene terephthalate or polyethylene naphthalate, and the thermoplastic resin B be a cyclohexanedimethanol-derived polyester. The "cyclohexanedimethanol-derived polyester" is a polyester containing cyclohexanedimethanol as a diol component, and refers to a copolymer with another ester structural unit, a polyester containing cyclohexanedimethanol as a single diol component, or a polyester that is a blend of the above-mentioned components with another polyester resin and in which cyclohexanedimethanol residues preferably occupy half or more of all the diol residues in the polyester resin. The cyclohexanedimethanol-derived polyester is preferable because it has a small glass transition temperature difference from polyethylene terephthalate or polyethylene naphthalate, and thus is not easily overstretched during molding and is also difficult to delaminate. More preferably, at least one thermoplastic resin is an ethylene terephthalate polycondensate having a copolymerization amount of cyclohexanedimethanol of 15 mol % or more and 60 mol % or less. In such a configuration, the reflective film suffers from little change in the optical characteristics particularly due to heating or aging, and hardly causes delamination while having high reflection performance. An ethylene terephthalate polycondensate having a copolymerization amount of cyclohexanedimethanol of 15 mol % or more and 60 mol % or less adheres very strongly to polyethylene terephthalate. In addition, cyclohexanedimethanol groups of the ethylene terephthalate polycondensate have cis and trans isomers as geometric isomers, and also have chair and boat isomers as conformational isomers. Therefore, the ethylene terephthalate polycondensate is hardly oriented and crystallized when being subjected to co-stretching with polyethylene terephthalate, has high reflectance, suffers from even less change in optical characteristics due to thermal history, and is hardly torn during film formation.

The reflective film that constitutes the light source unit according to the present invention preferably contains a scatterer. As used herein, the term "scatterer" refers to inorganic particles and organic particles that maintain a solid form even at a temperature equal to or higher than the melting point of a general resin that constitutes the reflective film as well as a material in which a resin other than the majority of the resin that constitutes the reflective film is dispersed. Examples of the shape of the usable scatterer include particles such as aggregated particles, spherical particles, beaded particles, confetti-like particles, and scale-like particles. In particular, in the case of aggregated particles, the dispersion diameter is determined by the aggregate diameter. Examples of usable materials of the particles include, in the case of inorganic particles, iron oxide, magnesium oxide, cerium oxide, zinc oxide, barium carbonate, barium titanate, barium chloride, barium hydroxide, barium oxide, alumina, selenite, silicon oxide (silica), calcium carbonate, titanium oxide, alumina, zirconia, aluminum silicate, mica, pearl mica, pyrophyllite clay, calcined clay, bentonite, talc, kaolin, and other composite oxides. Meanwhile, organic particles are not particularly limited, and examples thereof include particles of a thermoplastic resin, a thermosetting resin, and a photocurable resin. When the resin that constitutes a layer containing the particles (the thermoplastic resin A or the thermoplastic resin B) is a polyester, examples of the organic particles include particles made of resins such as crosslinked polyethylene, a crosslinked or non-crosslinked polystyrene resin, a crosslinked or non-crosslinked acrylic resin, a fluororesin, and a silicon resin, or various amide compounds such as stearic acid amide, oleic acid amide, and fumaric acid amide, and acrylic beads. In particular, preferable examples of polystyrene resin copolymers include a styrene-ethylene butylene-styrene copolymer, a styrene-butadiene copolymer, an acrylonitrile-butadiene-styrene copolymer, and a methacrylate-butadiene-styrene copolymer (MBS). In particular, it is preferable to use crosslinked particles in combination with a non-crosslinked copolymer having the same component as that of the crosslinked particles. When the organic particles according to embodiments of the present invention are, for example, an aggregate of crosslinked MBS particles present in an MBS copolymer matrix, the particle shape is deformed in association with the stretching behavior in the film forming step, so that voids are hardly formed and a light scattering factor can be suppressed.

In the reflective film that constitutes the light source unit according to the present invention, at least one outermost layer of the reflective film preferably has a content of the scatterer of 0.1 wt % or less based on the outermost layer. More preferably, the outermost layer does not contain the scatterer. When the reflective film contains the scatterer, the light transmitted through the reflective film is scattered, and it is easy to achieve a scattering angle obtained from the angles R1 and R2 (R1<R2) at which the transmitted light intensity is Tmax(0)/100 of 5° or more, a scattering angle obtained from the angles R3 and R4 (R3<R4) at which the transmitted light intensity is Tmax(45)/100 of 5° or more, and an L*(SCE) value of 30 or more. Meanwhile, due to the scattering of the light, the light extraction efficiency in the front direction when the reflective film is mounted on a display may decrease, so that the luminance may decrease. Herein, most of the scattering caused by the decrease in the light extraction efficiency to the front side is caused by light scattering on the film surface. Therefore, when the surface layer of the reflective film contains the scatterer, the scattering on the film surface is further enhanced. Alternatively, when the scatterer is contained not in the surface layer but only in the inner layer of the layers that constitute the reflective film, it is possible to improve the luminance while efficiently suppressing the causes of luminance unevenness and color unevenness. More preferably, both the surface layers of the reflective film do not contain the scatterer. In this case, light scattering on the film surface hardly occurs, so that high luminance can be maintained, and in particular, a scattering angle obtained from the angles R5 and R6 (R5<R6) at which the transmitted light intensity is Tmax (0)/2 of 3° or less, and an L*(SCI) value of 60 or more can be easily achieved.

<Method for Producing Reflective Film>

Then, a preferable method for producing the reflective film that constitutes the light source unit according to the present invention will be described below by taking a reflective film containing the thermoplastic resins A and B as an example. Of course, the present invention should not be construed as being limited to such an example. In addition, the lamination structure of the reflective film used in the present invention can be easily realized by a method similar to that described in paragraphs [0053] to [0063] of Japanese Patent Laid-open Publication No. 2007-307893.

The thermoplastic resins are prepared in the form of pellets. The pellets are dried in hot air or under vacuum as necessary, and then supplied to separate extruders. When the reflective film contains an ultraviolet absorber, pellets containing an ultraviolet absorber are prepared in advance by kneading the ultraviolet absorber into the thermoplastic resins, or the thermoplastic resins and an ultraviolet absorber are kneaded in an extruder. The resins melted in the extruder by heating to a temperature equal to or higher than the melting point are made uniform as to the extrusion amount by a gear pump or the like, and are freed of any foreign matters or denatured resin through a filter or the like. These resins are molded into a desired shape by a die and then discharged. Then, a multilayer laminated sheet discharged from the die is extruded onto a cooling body such as a casting drum, and cooled and solidified into a cast film. In this process, it is preferable to bring the sheet into close contact with the cooling body such as a casting drum by an electrostatic force using a wire-like, tape-like, needle-like, or knife-like electrode, and to rapidly cool and solidify the sheet. It is also preferable to employ a method of bringing the sheet into close contact with the cooling body such as a casting drum by blowing air from a slit-like, spot-like, or planar device, and rapidly cooling and solidifying the sheet, or bringing the sheet into close contact with the cooling body using a nip roll, and rapidly cooling and solidifying the sheet.

A plurality of resins including the thermoplastic resin used in the layer A and the thermoplastic resin B different from the thermoplastic resin A are sent out from different flow paths using two or more extruders, and sent into a multilayer laminating apparatus. Examples of usable multilayer laminating apparatuses include a multi-manifold die, a feed block, and a static mixer. In particular, in order to efficiently obtain the configuration of the present invention, a feed block having 11 or more fine slits is preferably used. Since the apparatus is not extremely large, use of such a feed block produces little foreign matters by thermal deterioration, and enables highly precise lamination even when an extremely large number of layers are laminated. Moreover, the precision of lamination in the width direction is also significantly improved as compared with conventional techniques. Further, since the apparatus is capable of adjusting the thickness of each layer by the shape (length and width) of the slit, an arbitrary layer thickness can be achieved.

The molten multilayer laminate formed to have a desired layer structure as described above is led to a die, and a cast film is obtained similarly to the above.

The cast film thus obtained is preferably biaxially stretched. Herein, "biaxial stretching" refers to stretching in the longitudinal direction and the width direction. Stretching may be performed sequentially in two directions or simultaneously in two directions. Further, the cast film may be re-stretched in the longitudinal direction and/or the width direction.

First, the case of sequential biaxial stretching will be described. Herein, the wording "stretching in the longitudinal direction" refers to stretching for imparting molecular orientation in the longitudinal direction to the film, and is usually performed by a difference in the peripheral speed of rolls. The stretching in the longitudinal direction may be performed in one stage, or in a plurality of stages using a plurality of pairs of rolls. Although the draw ratio varies depending on the type of the resin, it is usually preferably 2 to 15. When polyethylene terephthalate is used in any of the resins that constitute the reflective film, the draw ratio is particularly preferably 2 to 7. The stretching temperature is preferably in the range of (the glass transition temperature of the resin that constitutes the reflective film) to (the glass transition temperature+100° C.).

Herein, in order to suppress thickness unevenness in the longitudinal direction of the film, it is important to increase the orientation of the film during stretching. In particular, in order to set the difference among low wavelength ends of reflection bands at three points that are continuously present at an interval of 10 cm in the long direction and the short direction to 30 nm or less, the stretching temperature in the longitudinal direction is preferably set to (the glass transition temperature of the resin+20° C.) or lower. The film is preferably stretched at a temperature of (the glass transition temperature+10° C.) Further, the suppression of thickness unevenness in the longitudinal direction of the film can also be achieved by increasing the draw ratio in the longitudinal direction of the film. However, if the draw ratio is increased too much, the uniformity of the bands may be impaired during the subsequent stretching in the width direction. Therefore, the draw ratio in the longitudinal direction is preferably substantially in the range of 3.4 to 4.0.

The uniaxially stretched film thus obtained is subjected to a surface treatment such as a corona treatment, a flame treatment, or a plasma treatment as necessary, and then functions such as slipperiness, easy adhesion, and antistatic properties may be imparted to the film by in-line coating. In particular, in the production of a laminated member including a reflective film and a color conversion sheet, it is preferable to perform in-line coating with a resin that has a refractive index lower than the refractive index of the thermoplastic resin A that constitutes the outermost layer of the reflective film and higher than the refractive index of the film that constitutes the outermost layer of the color conversion member.

The subsequent "stretching in the width direction" refers to stretching for imparting orientation in the width direction to the film, and is usually performed by conveying the film using a tenter with both ends of the film being held with clips. Although the draw ratio varies depending on the type of the resin, it is usually preferably 2 to 15. When polyethylene terephthalate is used in any of the resins that constitute the reflective film, the draw ratio is particularly preferably 2 to 7. In particular, in the reflective film according to the present invention, the transverse draw ratio is preferably 4 or more. Increasing the transverse draw ratio is effective for increasing the uniformity of the reflection bands, the uniformity of the average reflectances, and the correlation coefficient. The stretching temperature is preferably in the range of (the glass transition temperature of the resin that constitutes the reflective film) to (the glass transition temperature+120° C.)

The film biaxially stretched as described above is preferably subjected to a heat treatment for imparting planarity and dimensional stability in the tenter at a temperature equal to or higher than the stretching temperature and equal to or lower than the melting point. The heat treatment improves the dimensional stability of the film to be molded. After being heat-treated in this manner, the film is gradually cooled down uniformly, and then cooled to room temperature and wound up. A relaxation treatment or the like may be combined as necessary during the gradual cooling from the heat treatment.

Then, the case of simultaneous biaxial stretching will be described. In the case of simultaneous biaxial stretching, the obtained cast film is subjected to a surface treatment such as a corona treatment, a flame treatment, or a plasma treatment as necessary, and then functions such as slipperiness, easy adhesion, and antistatic properties may be imparted to the film by in-line coating.

Then, the cast film is led to a simultaneous biaxial tenter, conveyed with both ends of the film being held with clips, and stretched in the longitudinal direction and the width direction simultaneously and/or in stages. Examples of a simultaneous biaxial stretching machine include those of a pantograph type, a screw type, a drive motor type, and a linear motor type. A simultaneous biaxial stretching machine of a drive motor type or a linear motor type is preferable because the machine is capable of changing the draw ratio arbitrarily and capable of performing the relaxation treatment at any place. Although the draw ratio varies depending on the type of the resin, it is usually preferably 6 to 50 in area ratio. When polyethylene terephthalate is used in any of the resins that constitute the reflective film, the draw ratio is particularly preferably 8 to 30 in area ratio. In particular, in the case of simultaneous biaxial stretching, it is preferable to make the draw ratios in the longitudinal direction and the width direction the same and to make the stretching speeds in the longitudinal direction and the width direction substantially equal in order to suppress the in-plane orientation difference. The stretching temperature is preferably in the range of (the glass transition temperature of the resin that constitutes the reflective film) to (the glass transition temperature+120° C.)

The film biaxially stretched as described above is preferably subsequently subjected to a heat treatment for imparting planarity and dimensional stability in the tenter at a temperature equal to or higher than the stretching temperature and equal to or lower than the melting point. In the heat treatment, it is preferable to perform a relaxation treatment in the longitudinal direction instantaneously immediately before and/or immediately after the film enters the heat treatment zone in order to suppress the distribution of the main orientation axis in the width direction. After being heat-treated in this manner, the film is gradually cooled down uniformly, and then cooled to room temperature and wound up. A relaxation treatment in the longitudinal direction and/or the width direction may be performed as necessary during the gradual cooling from the heat treatment. The relaxation treatment is performed in the longitudinal direction instantaneously immediately before and/or immediately after the film enters the heat treatment zone.

It is also preferable to form an irregular shape on the surface of the obtained reflective film as described below. Examples of the method for forming the irregular shape include (a) a mold transfer method using a mold and (b) a method of directly processing the surface of the base material. More detailed examples of the mold transfer method (a) include: (a1) a method of pressurizing and press-bonding a mold in a state where the mold and/or the base material is heated to form the irregular shape, (a2) a method of laminating a photocurable resin or a thermosetting resin on the surface of the base material, pressing a mold against the surface, and curing the resin by irradiation with active energy rays or heating to form the irregular shape, and (a3) a method of transferring a resin preliminarily filled in the cavity of a mold onto the base material.

Examples of the method (b) of directly processing the surface of the base material include: (b1) a method of mechanically grinding the surface into a desired shape using a cutting jig or the like, (b2) a method of grinding the surface by sandblasting, (b3) a method of grinding the surface by laser, and (b4) a method of laminating a photocurable resin on the surface of the base material, and processing the surface of the base material into a desired shape using a technique such as lithography or optical interference exposure.

Among the above-mentioned methods, the mold transfer method (a) is a more preferable production method from the viewpoint of productivity. It is also possible to combine these processes, and selection of appropriate processes can provide a reflective film having a desired irregular shape.

<Bonding of Reflective Film to Color Conversion Member>

As for the laminated member according to the present invention that is obtained by bonding the reflective film to the color conversion member, it is also preferable to bond together the color conversion member and the reflective film that are individually produced with an adhesive layer interposed therebetween.

The light source unit according to the present invention preferably includes, in addition to the adhesive layer, an optical film such as a reflective film, a light guide plate, a diffusion panel, a diffusion film, a condensing film, or a polarizing reflective film inserted between the color conversion member and the reflective film.

<Light Source Unit>

The light source unit according to embodiments of the present invention has a configuration including at least the light source and the color conversion member. The manner of arrangement of the light source and the color conversion member is not particularly limited, and it is possible to employ a configuration in which the light source and the color conversion member are in close contact with each other, or a remote phosphor configuration in which the light source and the color conversion member are separated from each other. Further, it is also possible to employ a configuration in which the light source unit further includes a color filter for the purpose of increasing the color purity.

The light source unit according to the present invention can be used in applications such as displays, illumination, interiors, signs, and signboards, and is particularly suitably used in displays and illumination applications.

EXAMPLES

Hereinafter, the present invention will be described with reference to examples, but the present invention is not limited to these examples.

<Measurement of Emission Intensity and Emission Band of Light Source>

An optical fiber having a numerical aperture NA of 0.22 was attached to a mini-spectrometer (C10083MMD) manufactured by Hamamatsu Photonics K.K., and light from a light source was measured. As for the obtained emission spectrum, the wavelength at which the emission spectrum exhibited the maximum intensity was defined as the emission peak wavelength of the light source, and an emission band in which the light source exhibited an intensity of 50% or more of the emission intensity at the emission peak wavelength of the light source was defined as the emission band of the light source.

<Measurement of Emission Intensity and Light Exit Band of Color Conversion Member>

An optical fiber having a numerical aperture NA of 0.22 was attached to a mini-spectrometer (C10083MMD) manufactured by Hamamatsu Photonics K.K., and light exited from a color conversion member irradiated with light from a light source was measured. As for the obtained emission spectrum, the wavelength at which the emission spectrum exhibited the maximum intensity and which was different from the emission peak wavelength of the light source was defined as the light exit peak wavelength of the color conversion member, and a band in which the color conversion member exhibited an intensity of 50% or more of the light exit intensity at the light exit peak wavelength of the color conversion member was defined as the light exit band of the color conversion member. Since the color conversion member used in the present application exhibited a maximum point other than the light exit peak defined above, the maximum point was defined as a second emission peak.

<Measurement of Reflectance, Reflection Band, and Transmittance of Reflective Film>

A variable angle transmission accessory was attached to a spectrophotometer (U-4100 Spectrophotomater) manufactured by Hitachi, Ltd., and the P-wave reflectance and the S-wave reflectance at an incident angle $\varphi=10°$ and a wavelength of 250 to 1600 nm as well as the transmittance at an incident angle $\varphi=0°$ and a wavelength of 250 to 1600 nm were measured. The measurement conditions were slits of 2 nm (visible)/automatic control (infrared), a gain of 2, and a scanning speed of 600 nm/min. Assuming 65 inches, 5 cm×10 cm samples were cut out at an interval of 45 cm from the film longitudinal direction and at an interval of 70 cm from the film width direction, and subjected to the measurement. Further, from the positions adjacent at a distance of 10 cm in the longitudinal direction and the width direction to the positions where the samples of the center in the longitudinal direction and the width direction of the film were collected, samples were similarly collected. The reflectance was measured at both sides of the film, and the result of the higher reflectance was used as the reflectance in the present application.

Detailed Parameters were Calculated as Follows.

<Low Wavelength End and High Wavelength End of Reflection Band, and $\lambda1$ and $\lambda2$ of Reflective Film>

For the reflection spectra obtained as described above, an average reflection spectrum of the P-wave and the S-wave was calculated for each wavelength. The maximum reflectance in a wavelength range of 400 to 1600 nm was defined as Rmax (%), and a low wavelength end and a long wavelength end of the reflection band of the reflective film were determined, wherein the low wavelength end is a wavelength that is the lowest in the wavelengths at which the reflectance is Rmax/2 (%) and is 400 nm or more, and the long wavelength end is a wavelength that is the longest in the wavelengths at which the reflectance is Rmax/2 (%) and is 1600 nm or less. Similarly, the wavelength at which the reflectance is RMax/4 (%) and near the low wavelength end was defined as $\lambda1$, and the wavelength at which the reflectance is Rmax×¾ and near the low wavelength end was defined as $\lambda2$.

<Transmission Band of Reflective Film>

As for the transmission spectrum at an incident angle of 0° obtained as described above, a wavelength section in which the transmittance was 80% or more over a continuous wavelength section of 50 nm in a wavelength range of 400 to 700 nm and which was on the shortest wavelength side was defined as the transmission band.

<Average Transmittance in Emission Band of Light Source>

For the transmission spectrum obtained as described above, an average transmission spectrum was calculated using the average value of the P-wave and the S-wave for each wavelength. Based on the average transmission spectrum, the average transmittance in the emission band of the light source calculated as described above was calculated.

<Maximum Reflectance and Average Reflectance in Light Exit Band of Color Conversion Member>

For the reflection spectra obtained as described above, an average reflection spectrum was calculated using the average value of the P-wave and the S-wave for each wavelength. Based on the average reflection spectrum, the maximum reflectance and the average reflectance in the light exit band of the color conversion member calculated as described above were calculated.

<Correlation Coefficient>

For the reflection spectra obtained as described above, an average reflection spectrum was calculated using the average value of the P-wave and the S-wave for each wavelength. For each film sample collected at an end of the film width direction or the film longitudinal direction, the correlation coefficient for the average reflection spectrum in a wavelength section of 400 to 800 nm between the film sample and a sample collected at the center of the film was calculated to obtain four correlation coefficients. Among the four correlation coefficients, the smallest correlation coefficient was regarded as the minimum value of the correlation coefficient.

<Measurement of Scattering Angle>

The scattering angle is measured using an automatic goniophotometer model GP-200 manufactured by MURAKAMI COLOR RESEARCH LABORATORY. In the measurement, the scattering angle was measured by changing the angle of the light-receiving part from −90° to +90° with a sample being placed perpendicularly and at an angle of 45° to the optical path and with the luminous flux aperture being 1 and the light-receiving aperture being 3. The measurement of the film was performed in two ways, that is, a case where the film was placed with the direction of change in the angle being the film width direction and a case where the film was placed with the direction of change in the angle being the film longitudinal direction. Of the scattering angles calculated by each of the methods, a larger value was defined as the scattering angle in the present application.

The scattering angle at which the transmitted light intensity is Tmax(0)/100 is calculated as follows. First, the maximum transmitted light intensity in the range of −90° to +90° is defined as Tmax(0). Then, the value obtained from R2−R1 is defined as the scattering angle at which the transmitted light intensity is Tmax(0)/100, wherein R1 and R2 (R1<R2) are angles of the light-receiving part at which the obtained amount of light is Tmax(0)/100. Similarly, the value obtained from R4−R3 is defined as the scattering angle at which the transmitted light intensity is Tmax(45)/100, wherein Tmax(45) is the transmitted light intensity that is the maximum in the range of −90° to +90°, and R3 and R4 (R3<R4) are angles of the light-receiving part at which the obtained amount of light is Tmax(45)/100. When the transmitted light intensity is not Tmax(45)/100 at a light-receiving angle of 90°, R4 is regarded as 90°. Similarly, the value obtained from R6−R5 is defined as the scattering angle at which the transmitted light intensity is Tmax(0)/2, wherein Tmax(0) is the transmitted light intensity that is the maximum in the range of −90° to +90°, and R5 and R6 (R5<R6) are angles of the light-receiving part at which the obtained amount of light is Tmax(0)/2.

<Colorimetric Value>

A spectrocolorimeter CM-3600d manufactured by KONICA MINOLTA SENSING, INC. was used. Under the conditions of a target mask (CM-A106) having a measurement diameter of φ8 mm, the L* value (SCE) and the L* value (SCI) value were measured, and the average value at a number of n of 5 was obtained. The white calibration plate and the zero calibration box used in the calibration were as follows. Note that D65 was selected as the light source used in calculating the colorimetric value.

White calibration plate: CM-A103
Zero calibration box: CM-A104

<Haze>

The haze was measured using a turbidimeter NDH-5000 manufactured by NIPPON DENSHOKU INDUSTRIES CO., LTD. in a measurement mode in accordance with JIS K 7136.

<Measurement of Luminance and Color Tone>

As a light source unit including a light source for evaluation, a light source unit for a TV set KD-65X9500B manufactured by Sony Corporation was used. The emission band of the backlight is 440 to 458 nm. The luminance of the light source unit was measured using, in the light source unit, an attached diffusion panel, a white reflective film manufactured by TORAY INDUSTRIES, INC., a color conversion member (that may be a laminated member including a reflective film and a color conversion member), and (that may include a second reflective film), an attached prism film, and an attached polarizing reflective film, using CA-2000 (KONICA MINOLTA, INC.) with the attached CCD camera being placed at a point of 90 cm from the backlight surface so that the camera came in front of the surface of the light source unit. The relative luminance relative to the luminance in Comparative Example 1 taken as 100 (relative luminance) is shown in the tables. In addition, as for the x value and the y value measured at the same time, the differences between the maximum value and the minimum value each at five positions on the screen were defined as Δx and Δy, respectively.

In addition, the luminance and color tone unevenness were measured at a position 5 cm from both ends in the horizontal direction (long direction) and the vertical direction (short direction) of the TV set. The differences in the luminance and color tone unevenness from those in Comparative Example 1 were found using the following indices, and the samples were judged as acceptable or rejectable.

Relative Luminance
S: 105 or more
A: 95 or more and less than 105
B: less than 95
Luminance Unevenness
S: Difference in luminance at five positions in the plane is 1% or less compared to the blank
A: Difference in luminance at five positions in the plane is 2% or less compared to the blank
B: Difference in luminance at five positions in the plane exceeds 2% compared to the blank
Color Tone Unevenness
S: Δx and Δy at five positions in the plane are each 0.005 or less compared to the blank
A: Δx and Δy at five positions in the plane are each 0.010 or less compared to the blank
B: Δx and Δy at five positions in the plane each exceed 0.010 compared to the blank <Glass Transition Temperature>

A DSC curve of the measured sample was obtained according to JIS-K-7122 (1987) using "Robot DSC-RDC6220" manufactured by Seiko Instruments & Electronics Ltd. In the test, the sample was heated from 25° C. to 300° C. at a heating rate of 20° C./min, held in the same state for 5 minutes, then rapidly cooled to a temperature of 25° C. or lower, and again heated from 25° C. to 300° C. at a heating rate of 20° C./min. The glass transition temperature was measured from the obtained differential scanning calorimetry chart.

Synthesis Example 1

Method for Synthesizing Green Color Conversion Material G-1

Into a flask, 3,5-dibromobenzaldehyde (3.0 g), 4-t-butylphenylboronic acid (5.3 g), tetrakis(triphenylphosphine)palladium(0) (0.4 g), and potassium carbonate (2.0 g) were charged, and the atmosphere in the flask was replaced with nitrogen. Degassed toluene (30 mL) and degassed water (10 mL) were added to the flask, and the contents were refluxed for 4 hours. The resulting reaction solution was cooled to room temperature, and the organic layer was separated and washed with saturated brine. The organic layer was dried over magnesium sulfate and filtered, and then the solvent was distilled off. The obtained reaction product was purified by silica gel chromatography to give 3,5-bis(4-t-butylphenyl)benzaldehyde (3.5 g) as a white solid.

To the reaction solution, 3,5-bis(4-t-butylphenyl)benzaldehyde (1.5 g) and 2,4-dimethylpyrrole (0.7 g) were added, and dehydrated dichloromethane (200 mL) and trifluoroacetic acid (1 drop) were added, and the resulting mixture was stirred in a nitrogen atmosphere for 4 hours. A dehydrated dichloromethane solution of 2,3-dichloro-5,6-dicyano-1,4-benzoquinone (0.85 g) was added to the mixture, and the resulting mixture was further stirred for 1 hour. After completion of the reaction, a boron trifluoride diethyl ether complex (7.0 mL) and diisopropylethylamine (7.0 mL) were added to the mixture, and the mixture was stirred for 4 hours. Then, water (100 mL) was further added to the mixture, the mixture was stirred, and the organic layer was separated. The organic layer was dried over magnesium sulfate and filtered, and then the solvent was distilled off. The obtained reaction product was purified by silica gel chromatography to give 0.4 g of Compound G-1 shown below (yield: 18%).

Synthesis Example 2

Method for Synthesizing Red Color Conversion Material R-1

A mixed solution of 300 mg of 4-(4-t-butylphenyl)-2-(4-methoxyphenyl)pyrrole, 201 mg of 2-methoxybenzoyl chloride, and 10 mL of toluene was heated at 120° C. for 6 hours under a nitrogen stream. After cooled to room temperature, the mixed solution was evaporated. After washing with 20 mL of ethanol and vacuum drying, 260 mg of 2-(2-methoxybenzoyl)-3-(4-t-butylphenyl)-5-(4-methoxyphenyl)pyrrole was obtained.

Then, a mixed solution of 260 mg of 2-(2-methoxybenzoyl)-3-(4-t-butylphenyl)-5-(4-methoxyphenyl)pyrrole, 180 mg of 4-(4-t-butylphenyl)-2-(4-methoxyphenyl)pyrrole, 206 mg of a methanesulfonic anhydride, and 10 mL of degassed toluene was heated at 125° C. for 7 hours under a nitrogen stream. After cooling to room temperature, 20 mL of water was poured into the mixed solution, and the mixed solution was extracted with 30 mL of dichloromethane. The organic layer was washed twice with 20 mL of water, evaporated, and vacuum-dried.

Then, under a nitrogen stream, 305 mg of diisopropylethylamine and 670 mg of a boron trifluoride diethyl ether complex were added to a mixed solution of the obtained pyrromethene compound and 10 mL of toluene, and the resulting mixture was stirred at room temperature for 3 hours. Into the mixed solution, 20 mL of water was poured, and the mixed solution was extracted with 30 mL of dichloromethane. The organic layer was washed twice with 20 mL of water, dried over magnesium sulfate, and then evaporated. After purification by silica gel column chromatography and vacuum drying, 0.27 g of a reddish purple powder was obtained.

Example 1

A Reflective Film was Obtained by the Method Shown Below.

As the thermoplastic resin A, a mixture of polyethylene naphthalate (PEN) having a glass transition temperature of 124° C. and silica particles having a dispersion diameter of 4 μm added in an amount of 0.1 wt % of the entire thermoplastic resin A was used. As the thermoplastic resin B, ethylene terephthalate (PETG) copolymerized with cyclohexanedimethanol and having a glass transition temperature of 78° C., which is an amorphous resin having no melting point, was used. The prepared crystalline polyester and the thermoplastic resin B were respectively put into two single-screw extruders, melted at 280° C., and kneaded. Then, the crystalline polyester and the thermoplastic resin B were each passed through 5 sheets of FSS type leaf disc filters, and then merged with a laminating apparatus having 11 slits and designed so that the outermost layer might have a thickness that is 5% of the film thickness while the crystalline polyester and the thermoplastic resin B were measured with a gear pump. Thus, a laminate including 11 alternating layers in the thickness direction was obtained. The method for forming the laminate was in accordance with the description in paragraphs [0053] to [0056] of Japanese Patent Laid-open Publication No. 2007-307893. Herein, all the slit lengths and intervals were constant. The obtained laminate had 6 layers of the thermoplastic resin A and 5 layers of the thermoplastic resin B, and had a lamination structure in which the layers were alternately laminated in the thickness direction. The value obtained by dividing the length of the cap lip in the film width direction by the length of the inlet of the cap in the film width direction, which is the widening ratio inside the cap, was set to 2.5.

The obtained cast film was heated with a group of rolls set at 130° C., then stretched 3.3 times in the film longitudinal direction at a film temperature of 135° C. while rapidly heated from both sides of the film with a radiation heater in a stretching section of 100 mm in length, and then cooled once. Then, both sides of the uniaxially stretched film were subjected to a corona discharge treatment in the air so that the base material film might have a wetting tension of 55 mN/m. A laminate-forming film coating liquid containing (a polyester resin having a glass transition temperature of 18° C.)/(a polyester resin having a glass transition temperature of 82° C.)/(silica particles having an average particle diameter of 100 nm) was applied to the treated surface of the base material film to form a transparent, slippery, and easily adhesive layer. The easily adhesive layer had a refractive index of 1.57.

The uniaxially stretched film was led to a tenter, preheated with hot air of 110° C., and stretched 4.5 times in the film width direction at a temperature of 130° C. The stretching speed and temperature in the stretching were constant. The stretched film was directly heat-treated in a tenter with hot air of 240° C., then subjected to a 2% relaxation treatment in the width direction under the same temperature conditions, further rapidly cooled to 100° C., then subjected to a 5% relaxation treatment in the width direction, and then wound up to give a reflective film.

A color conversion member was obtained by the method shown below.

Using an acrylic resin 1 (SP value=9.5 $(cal/cm^3)^{0.5}$) as a binder resin, 0.25 parts by weight of Compound G-1 as a light-emitting material (a) and 400 parts by weight of toluene as a solvent were mixed to 100 parts by weight of the binder resin. Then, the resulting mixture was stirred and defoamed at 300 rpm for 20 minutes using Planetary Mixer/Deaerator "MAZERUSTAR (registered trademark)" KK-400 (manufactured by KURABO INDUSTRIES LTD.) to give a color conversion composition for producing a layer (A). Similarly, using a polyester resin 1 (SP value=10.7 $(cal/cm^3)^{0.5}$) as a binder resin, 0.017 parts by weight of Compound R-1 as a light-emitting material (b) and 300 parts by weight of toluene as a solvent were mixed to 100 parts by weight of the binder resin. Then, the resulting mixture was stirred and defoamed at 300 rpm for 20 minutes using Planetary Mixer/Deaerator "MAZERUSTAR (registered trademark)" KK-400 (manufactured by KURABO INDUSTRIES LTD.) to give a color conversion composition for producing a layer (B).

Then, using a slit die coater, the color conversion composition for producing a layer (A) was applied to a PET film having a thickness of 50 μm, and heated at 100° C. for 20 minutes and dried to give a layer (A) having an average film thickness of 16 μm. Similarly, using a slit die coater, the color conversion composition for producing a layer (B) was applied to a PET base material layer side of a light diffusion film "CHEMICAL MAT" 125PW (manufactured by KIMOTO Co., Ltd., thickness: 138 μm) as the base material layer, and heated at 100° C. for 20 minutes and dried to give a layer (B) having an average film thickness of 48 μm.

Then, the above-mentioned two units were heated and laminated so that the layer (A) and the layer (B) were directly laminated with each other to give a color conversion member.

The evaluation results of a light source unit including the obtained reflective film and color conversion member are shown in Table 1. The scattering angle obtained from the angles R1 and R2 (R1<R2) at which the transmitted light intensity is Tmax(0)/100 of the reflective film was 19°. As for the film surface of the reflective film, the low wavelength end of the reflection band at an incident angle of 10° was 545 nm, and was present on the longer wavelength side than the long wavelength end at 485 nm of the emission band of the light source. The light source unit of Example 1 was remedied in luminance unevenness and color unevenness reflecting the improved scattering property, but was slightly reduced in the luminance due to the scattering property.

Example 2

As the thermoplastic resin A, polyethylene terephthalate (PET) having a glass transition temperature of 78° C. was used. As the thermoplastic resin B, a mixture of ethylene terephthalate copolymerized with 25 mol % spiroglycol and 30 mol % cyclohexanedicarboxylic acid (PE/SPG•T/CHDC), which is an amorphous resin having no melting point and having a glass transition temperature of 78° C., and silica particles having a dispersion diameter of 4 μm added in an amount of 0.1 wt % of the entire thermoplastic resin B was used. Using a reflective film including 51 layers A containing the thermoplastic resin A and 50 layers B containing the thermoplastic resin B, a cast film was obtained in the same manner as in Example 1.

The obtained cast film was heated with a group of rolls set at 72 to 78° C., then stretched 3.3 times in the film longitudinal direction at a film temperature of 90° C. while rapidly heated from both sides of the film with a radiation heater in a stretching section of 100 mm in length, and then cooled once. Then, both sides of the uniaxially stretched film were subjected to a corona discharge treatment in the air so that the base material film might have a wetting tension of 55 mN/m. A laminate-forming film coating liquid containing (a polyester resin having a glass transition temperature of 18° C.)/(a polyester resin having a glass transition temperature of 82° C.)/(silica particles having an average particle diameter of 100 nm) was applied to the treated surface of the base material film to form a transparent, slippery, and easily adhesive layer. The easily adhesive layer had a refractive index of 1.57.

The uniaxially stretched film was led to a tenter, preheated with hot air of 110° C., and stretched 4.5 times in the film width direction at a temperature of 130° C. The stretching speed and temperature in the stretching were constant. The stretched film was directly heat-treated in a tenter with hot air of 240° C., then subjected to a 2% relaxation treatment in the width direction under the same temperature conditions, further rapidly cooled to 100° C., then subjected to a 5% relaxation treatment in the width direction, and then wound up to give a reflective film.

The evaluation results of the obtained reflective film, color conversion member, and light source unit including the same are shown in Table 1. Compared to Example 1 in which the number of layers was small, a remarkable improvement in the luminance was observed, and the uniformity of color tone and luminance in the plane was comparable to that in Example 1.

Example 3

A reflective film and a color conversion member were obtained in the same manner as in Example 2 except that the number of layers of the layer A containing the thermoplastic resin A was 101, and the layer thickness of the layer B containing the thermoplastic resin B was 100 layers.

The evaluation results of the obtained reflective film, color conversion member, and light source unit including the same are shown in Table 1. Compared to Example 2 in which the number of layers was small, further improvement in the luminance was observed, and the uniformity of color tone and luminance in the plane was improved to a level at which unevenness is hardly recognizable.

Example 4

A reflective film and a color conversion member were obtained in the same manner as in Example 2 except that the number of layers of the layer A containing the thermoplastic resin A was 301, and the layer thickness of the layer B containing the thermoplastic resin B was 300 layers.

The evaluation results of the obtained reflective film, color conversion member, and light source unit including the same are shown in Table 1. A remarkable improvement in the luminance was observed, and the uniformity of color tone and luminance was also high.

Example 5

A reflective film and a color conversion member were obtained in the same manner as in Example 4 except that silica particles having a dispersion diameter of 4 μm as a dispersed material were added to the thermoplastic resin B in an amount of 0.2 wt % based on the entire thermoplastic resin B.

The evaluation results of the obtained reflective film, color conversion member, and light source unit including the same are shown in Table 1. Reflecting the increase in the amount of the dispersed material added compared to Example 4, higher uniformity of the luminance and color tone was observed owing to the improvement in the scattering property, but a slight decrease in the luminance was observed.

Example 6

A reflective film and a color conversion member were obtained in the same manner as in Example 4 except that silica particles having a dispersion diameter of 4 µm as a dispersed material were added to the thermoplastic resin B in an amount of 0.05 wt % based on the entire thermoplastic resin B.

The evaluation results of the obtained reflective film, color conversion member, and light source unit including the same are shown in Table 1. Reflecting the decrease in the amount of the dispersed material added compared to Example 4, slight luminance unevenness and color unevenness were observed due to the deterioration in the scattering property, but the reflective film, color conversion member, and light source unit were still at a usable level.

Example 7

A reflective film and a color conversion member were obtained in the same manner as in Example 4 except that no scatterer was added to the thermoplastic resin B, and that silica particles of 4 µm were added to the thermoplastic resin A in an amount of 0.1 wt % based on the entire thermoplastic resin A.

The evaluation results of the obtained reflective film, color conversion member, and light source unit including the same are shown in Table 1. Compared to Example 4 in which the same type and amount of dispersed material was added, higher uniformity of the luminance and color tone was observed owing to the improvement in the scattering property due to the change of the layer to which the dispersed material was added. Meanwhile, a decrease in the luminance was observed, and the degree of decrease in the luminance was remarkable compared to Example 5 in which comparable haze was observed.

Example 8

A reflective film and a color conversion member were obtained in the same manner as in Example 4 except that no scatterer was added to the thermoplastic resin B, and that silica particles of 4 µm were added to the thermoplastic resin A in an amount of 0.2 wt % based on the entire thermoplastic resin A.

The evaluation results of the obtained reflective film, color conversion member, and light source unit including the same are shown in Table 1. Compared to Example 5 in which the same type and amount of dispersed material was added, higher uniformity of the luminance and color tone was observed owing to the improvement in the scattering property due to the change of the layer to which the dispersed material was added, but a remarkable decrease in the luminance was observed.

Example 9

A reflective film and a color conversion member were obtained in the same manner as in Example 4 except that silica particles having a dispersion diameter of 2.5 µm as a dispersed material were added to the thermoplastic resin B in an amount of 0.2 wt % based on the entire thermoplastic resin B.

The evaluation results of the obtained reflective film, color conversion member, and light source unit including the same are shown in Table 1. A remarkable improvement in the luminance was observed, and the uniformity of color tone and luminance was also high.

Example 10

A reflective film and a color conversion member were obtained in the same manner as in Example 9 except that silica particles having a dispersion diameter of 2.5 µm as a dispersed material were added to the thermoplastic resin B in an amount of 0.4 wt % based on the entire thermoplastic resin B.

The evaluation results of the obtained reflective film, color conversion member, and light source unit including the same are shown in Table 1. Reflecting the increase in the amount of the dispersed material added compared to Example 9, luminance unevenness and color unevenness were almost invisible, but a slight decrease in the luminance was observed.

Example 11

A reflective film and a color conversion member were obtained in the same manner as in Example 7 except that silica particles having a dispersion diameter of 0.5 µm as a dispersed material were added to the thermoplastic resin A in an amount of 0.4 wt % based on the entire thermoplastic resin A.

The evaluation results of the obtained reflective film, color conversion member, and light source unit including the same are shown in Table 1. Since the size of the dispersed material was smaller compared to Example 7, the light emission from the color conversion member was not efficiently scattered, and slight luminance unevenness and color unevenness were observed although the transmittance in the emission band decreased. The reflective film, color conversion member, and light source unit, however, were still at a usable level.

Example 12

A reflective film and a color conversion film color conversion member were obtained in the same manner as in Example 4 except that the thickness of the surface layer of the reflective film was 0.5% relative to the film thickness.

The evaluation results of the obtained reflective film, color conversion film color conversion member, and light source unit including the same are shown in Table 2. A luminance improvement effect at a level equal to that in Example 4 was observed. Although the scattering property was the same as that in Example 4, the reflection band unevenness in the width direction of the film was large, and slight luminance unevenness and color unevenness were observed. The reflective film, color conversion film color conversion member, and light source unit, however, were at a sufficiently usable level.

Example 13

A reflective film and a color conversion member were obtained in the same manner as in Example 4 except that the film temperature when the cast film was stretched in the film longitudinal direction was 85° C.

The evaluation results of the obtained reflective film, color conversion member, and light source unit including the same are shown in Table 2. A luminance improvement effect at a level equal to or higher than that in Example 4 was observed, and the luminance unevenness and color unevenness were at a level not recognizable at all.

Example 14

A reflective film and a color conversion member were obtained in the same manner as in Example 4 except that the draw ratio when the cast film was stretched in the film longitudinal direction was 3.5 times.

The evaluation results of the obtained reflective film, color conversion member, and light source unit including the same are shown in Table 2. A luminance improvement effect at a level equal to or higher than that in Example 4 was observed, and the luminance unevenness and color unevenness were at a level not recognizable at all.

Example 15

A reflective film and a color conversion member were obtained in the same manner as in Example 4 except that a scatterer was added to the thermoplastic resin B, and that silica particles of 4 μm were added to the thermoplastic resin A in an amount of 0.1 wt % based on the entire thermoplastic resin A.

The evaluation results of the obtained reflective film, color conversion member, and light source unit including the same are shown in Table 2. Compared to Example 5 in which the total addition amount was the same, the uniformity of the luminance and color tone was comparable to that in Example 5 although the scatterer was also added to the surface layer. Meanwhile, a decrease in the luminance was observed, and the degree of decrease in the luminance was remarkable compared to Example 5 in which comparable haze was observed.

Example 16

A reflective film and a color conversion member were obtained in the same manner as in Example 6 except that a scatterer was added to the thermoplastic resin B, and that silica particles of 4 μm were added to the thermoplastic resin A in an amount of 0.05 wt % based on the entire thermoplastic resin A.

The evaluation results of the obtained reflective film, color conversion member, and light source unit including the same are shown in Table 2. Compared to Example 6 in which the same amount of the layer B was added, a luminance and color tone improvement effect was observed. Meanwhile, compared to Example 4 in which the total addition amount was the same, the uniformity of the luminance and color tone was comparable to that in Example 4 although the scatterer was also added to the surface layer, and a remarkable decrease in the luminance was observed.

Example 17

A reflective film and a color conversion member were obtained in the same manner as in Example 7 except that as a scatterer, calcium carbonate particles of 1 μm were added to the thermoplastic resin A in an amount of 0.2 wt % based on the entire thermoplastic resin A.

The evaluation results of the obtained reflective film, color conversion member, and light source unit including the same are shown in Table 2. Compared to Example 7 in which a different kind of particles were used, higher uniformity of the luminance and color tone was observed owing to the improvement in the scattering property, but a decrease in the luminance was observed.

Example 18

A reflective film and a color conversion member were obtained in the same manner as in Example 17 except that as a scatterer, calcium carbonate particles of 1 μm were added to the thermoplastic resin B in an amount of 0.2 wt % based on the entire thermoplastic resin B.

The evaluation results of the obtained reflective film, color conversion member, and light source unit including the same are shown in Table 2. Compared to Example 17 in which a different kind of particles were used, higher uniformity of the luminance and color tone was slightly lower owing to the improvement in the scattering property, but a high luminance was observed.

Comparative Example 1

A light source unit was formed using a color conversion member in the same manner as in Example 1 except that no reflective film was used.

The evaluation results of the light source unit are shown in Table 2. The luminance was lower than in any of Examples 1 to 9.

Comparative Example 2

A reflective film and a color conversion film color conversion member were obtained in the same manner as in Example 12 except that no scatterer was added.

The evaluation results of the obtained reflective film, color conversion film color conversion member, and light source unit including the same are shown in Table 2. A high luminance improvement effect equal to or higher than that in Example 12 was observed, but intense luminance unevenness and color unevenness were observed, and the reflective film, color conversion film color conversion member, and light source unit were unsuitable for use in a display.

Comparative Example 3

A reflective film and a color conversion member were obtained in the same manner as in Example 8 except that silica particles having a dispersion diameter of 2.5 μm as a dispersed material were added to the thermoplastic resin B in an amount of 0.05 wt % based on the entire thermoplastic resin B.

The evaluation results of the obtained reflective film, color conversion member, and light source unit including the same are shown in Table 2. Almost no remedy of the luminance unevenness and color unevenness owing to light scattering was observed because the amount of the dispersed material added was small, and the reflective film, color conversion member, and light source unit were unsuitable for use in a display.

Comparative Example 4

A reflective film and a color conversion member were obtained in the same manner as in Example 4 except that silica particles having a dispersion diameter of 0.5 μm as a dispersed material were added to the thermoplastic resin B in an amount of 0.1 wt % based on the entire thermoplastic resin B.

The evaluation results of the obtained reflective film, color conversion member, and light source unit including the same are shown in Table 2. Almost no remedy of the luminance unevenness and color unevenness was observed because the dispersion diameter of the dispersed material was small and the amount of the dispersed material added was also small, and the reflective film, color conversion member, and light source unit were unsuitable for use in a display.

TABLE 1

| | | | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|---|
| Light source | Emission band | nm | | | | | | 430 - 485 | | | | | |
| Color conversion film | Light exit band | nm | | | | | | 505 - 654 | | | | | |
| | Peak wavelength 1 | nm | | | | | | 515 | | | | | |
| | Peak wavelength 2 | nm | | | | | | 631 | | | | | |
| Reflective film | Ratio of surface layer thickness to film thickness | % | 5 | 5 | 5 | 5 | 5 | 5 | 5 | 5 | 5 | 5 | 5 |
| | Reflection band Bandwidth | nm | 545-653 | 538-665 | 535- 671 | 488-814 | 485-821 | 493-811 | 483-822 | 479-825 | 489-814 | 486-819 | 492- 812 |
| | λ1 | nm | 532 | 530 | 526 | 477 | 473 | 479 | 460 | 455 | 476 | 473 | 478 |
| | λ2 | nm | 565 | 560 | 549 | 502 | 512 | 500 | 513 | 515 | 503 | 509 | 501 |
| | Transmission band | nm | 400-527 | 400-521 | 400- 518 | 400-460 | 400-457 | 400-474 | 400-455 | 400-451 | 400-461 | 400-458 | 400- 473 |
| | Average transmittance in emission band (light emitted from light source) | % | 85 | 89 | 89 | 89 | 87 | 89 | 85 | 84 | 89 | 88 | 85 |
| | Maximum reflectance (incident angle: 10°) in light exit band (light exited from color conversion film) | % | 59 | 80 | 94 | 97 | 96 | 97 | 93 | 91 | 97 | 96 | 97 |
| | Average reflectance (incident angle: 10°) in light exit band (light exited from color conversion film) | % | 35 | 54 | 64 | 94 | 93 | 94 | 92 | 90 | 94 | 93 | 94 |
| | Scattering angle Scattering angle at which transmitted light intensity is Tmax(0)/100 | ° | 19 | 8 | 8 | 8 | 11 | 5 | 12 | 18 | 8 | 10 | 5 |
| | Scattering angle at which transmitted light intensity is Tmax(0)/2 | ° | 4 | 2 | 2 | 2 | 3 | 2 | 3 | 5 | 2 | 2 | 2 |
| | Scattering angle at which transmitted light intensity is Tmax(45)/100 | ° | 29 | 11 | 11 | 11 | 15 | 8 | 15 | 31 | 10 | 12 | 6 |
| | Colorimetric value L*(SCI) value | — | 45 | 53 | 61 | 74 | 72 | 72 | 69 | 65 | 74 | 74 | 68 |
| | L*(SCE) value | — | 21 | 26 | 31 | 32 | 34 | 29 | 37 | 42 | 32 | 34 | 27 |
| | L*(SCI)/L*(SCE) value | — | 2.1 | 2.0 | 2.0 | 2.3 | 2.1 | 2.5 | 1.9 | 1.5 | 2.3 | 2.2 | 2.5 |
| | Haze | % | 19 | 7 | 7 | 7 | 10 | 4 | 11 | 16 | 7 | 10 | 7 |
| | Difference between maximum value and minimum value of low | Both ends in long direction (Film width direction) | mm | 17 | 20 | 18 | 18 | 15 | 21 | 15 | 13 | 20 | 17 | 22 |

TABLE 1-continued

| | | | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|---|
| wavelength ends of reflective film | Both ends in short direction (Film longitudinal direction) | nm | 11 | 9 | 9 | 9 | 7 | 10 | 6 | 6 | 9 | 8 | 11 |
| | Three points at interval of 10 cm in long direction (Film width direction) | nm | 13 | 13 | 12 | 10 | 9 | 13 | 9 | 8 | 13 | 13 | 14 |
| | Three points at interval of 10 cm in short direction (Film longitudinal direction) | nm | 15 | 17 | 18 | 18 | 15 | 21 | 16 | 15 | 17 | 18 | 23 |
| Difference between maximum value and minimum value of average reflectances in reflection bands of reflective film | Long direction (Film width direction) | % | 5 | 5 | 3 | 3 | 3 | 5 | 3 | 3 | 4 | 3 | 6 |
| | Short direction (Film longitudinal direction) | % | 2 | 1 | 2 | 2 | 2 | 3 | 2 | 2 | 3 | 2 | 3 |
| Minimum value of correlation coefficients between center of film and four points including both ends in long direction and both ends in short direction | | | 0.91 | 0.93 | 0.95 | 0.97 | 0.98 | 0.94 | 0.98 | 0.99 | 0.96 | 0.97 | 0.93 |
| In-plane color tone unevenness | | — | A | A | A | S | S | A | S | S | S | S | A |
| Relative luminance | | % | A:97 | A:100 | S:108 | S:111 | S:109 | S:112 | S:105 | A:98 | S:112 | S:109 | S:105 |
| In-plane luminance unevenness | | — | A | A | A | S | S | A | S | S | S | S | A |

TABLE 2

|  |  | Example 12 | Example 13 | Example 14 | Example 15 | Example 16 | Example 17 | Example 18 | Comparative Example 1 | Comparative Example 2 | Comparative Example 3 | Comparative Example 4 |
|---|---|---|---|---|---|---|---|---|---|---|---|---|
| Light source | Emission band (nm) | 430-485 | | | | | | | | | | |
| Color conversion film | Light exit band (nm) | 505-654 | | | | | | | | | | |
| | Peak wavelength 1 (nm) | 515 | | | | | | | | | | |
| | Peak wavelength 2 (nm) | 631 | | | | | | | | | | |
| Reflective film | Ratio of surface layer thickness to film thickness (%) | 5 | 0.5 | 5 | 5 | 5 | 5 | 5 | — | 0.5 | 5 | 5 |
| | Reflection band Bandwidth (nm) | 487-808 | 493-815 | 495-812 | 485-821 | 490-815 | 488-814 | 490-811 | — | 501-803 | 493-811 | 493-811 |
| | λ1 (nm) | 461 | 479 | 479 | 473 | 476 | 477 | 478 | — | 461 | 480 | 479 |
| | λ2 (nm) | 513 | 502 | 501 | 512 | 503 | 502 | 500 | — | 512 | 501 | 500 |
| | Transmission band (nm) | 400-459 | 400-474 | 400-476 | 400-457 | 400-471 | 400-460 | 400-464 | — | 400-479 | 400-474 | 400-475 |
| | Average transmittance in emission band (light emitted from light source) (%) | 89 | 89 | 89 | 87 | 88 | 89 | 89 | — | 91 | 90 | 88 |
| | Maximum reflectance (incident angle: 10°) in light exit band (light exited from color conversion film) (%) | 97 | 98 | 98 | 96 | 96 | 97 | 97 | — | 97 | 98 | 97 |
| | Average reflectance (incident angle: 10°) in light exit band (light exited from color conversion film) (%) | 92 | 96 | 96 | 93 | 93 | 91 | 92 | — | 93 | 94 | 95 |
| | Scattering angle at which transmitted light intensity is Tmax(0)/100 (°) | 8 | 8 | 8 | 11 | 6 | 12 | 7 | — | 4 | 4 | 3 |
| | Scattering angle at which transmitted light intensity is Tmax(0)/2 (°) | 2 | 2 | 2 | 3 | 3 | 3 | 2 | — | 2 | 2 | 2 |
| | Scattering angle at which transmitted light intensity is Tmax(45)/100 (°) | 11 | 11 | 11 | 15 | 12 | 17 | 12 | — | 4 | 4 | 3 |

TABLE 2-continued

| | | Example 12 | Example 13 | Example 14 | Example 15 | Example 16 | Example 17 | Example 18 | Comparative Example 1 | Comparative Example 2 | Comparative Example 3 | Comparative Example 4 |
|---|---|---|---|---|---|---|---|---|---|---|---|---|
| Colorimetric value | L* (SCI) value | — | 74 | 73 | 73 | 65 | 69 | 70 | 72 | — | 74 | 74 | 74 |
| | L* (SCE) value | — | 31 | 32 | 31 | 38 | 31 | 35 | 31 | — | 19 | 26 | 21 |
| | L* (SCI)/L* (SCE) value | — | 2.4 | 2.3 | 2.4 | 1.7 | 2.2 | 2.0 | 2.3 | — | 3.9 | 2.8 | 3.5 |
| Haze | | % | 7 | 7 | 7 | 13 | 10 | 13 | 7 | — | 1 | 2 | 1 |
| Difference between maximum value and minimum value of low wavelength ends of reflective film | Both ends in long direction (Film width direction) | nm | 43 | 15 | 10 | 15 | 20 | 14 | 15 | — | 18 | 21 | 23 |
| | Both ends in short direction (Film longitudinal direction) | nm | 31 | 6 | 5 | 7 | 9 | 8 | 7 | — | 14 | 13 | 14 |
| | Three points at interval of 10 cm in long direction (Film longitudinal direction) | nm | 41 | 10 | 10 | 10 | 12 | 9 | 10 | — | 10 | 12 | 13 |
| | Interval of 10 cm in short direction (Film longitudinal direction) | nm | 31 | 15 | 9 | 16 | 20 | 15 | 14 | — | 13 | 18 | 21 |
| Difference between maximum value and minimum value of average reflectances in reflection bands of reflective film | Long direction (Film width direction) | % | 11 | 2 | 1 | 3 | 4 | 3 | 2 | — | 3 | 5 | 5 |
| | Short direction (Film longitudinal direction) | % | 3 | 2 | 2 | 2 | 3 | 2 | 2 | — | 2 | 3 | 3 |
| Minimum value of correlation coefficients between center of film and four points including both ends in long direction and both ends in short direction | | — | 0.79 | 0.98 | 0.98 | 0.99 | 0.95 | 0.98 | 0.98 | — | 0.77 | 0.93 | 0.97 |
| In-plane color tone unevenness | | — | A | 5 | 5 | 5 | A | 5 | A | A:100 | B | B | B |
| Relative luminance | | % | 5:109 | 5:113 | 5:114 | A:103 | A:108 | A:101 | 5:108 | — | 5:109 | 5:109 | 5:107 |
| In-plane luminance unevenness | | — | A | 5 | 5 | 5 | A | 5 | A | — | B | B | B |

DESCRIPTION OF REFERENCE SIGNS

1: Light source unit
2: Light source
3: Reflective film
4: Color conversion member
5: Laminated member
7: Both ends in long direction of reflective film
8: Both ends in short direction of reflective film
9: Center of reflective film
31: Example of irregular shape
32: Example of irregular shape
33: Functional layer
41: Film serving as base material of color conversion member
42: Film containing color conversion material

The invention claimed is:

1. A light source unit comprising:
a light source;
a color conversion member that converts incident light incident from the light source into light having a longer wavelength than the incident light does; and
a reflective film that is present between the light source and the color conversion member, transmits light incident from the light source, and reflects light exited from the color conversion member,
wherein in the reflective film, a scattering angle (R2−R1) on at least one film surface is 5° or more, where the scattering angle is obtained from angles R1 and R2 (R1<R2) at which a transmitted light intensity is Tmax(0)/100 relative to a maximum transmitted light intensity of halogen light incident perpendicularly to the film surface of Tmax(0).

2. The light source unit according to claim 1, wherein in at least one film surface of the reflective film, a low wavelength end of a reflection band at an incident angle of 10° is on a longer wavelength side than a long wavelength end of an emission band of the light source.

3. The light source unit according to claim 1, wherein in the reflective film, a scattering angle (R4−R3) on at least one film surface is 5° or more, where the scattering angle is obtained from angles R3 and R4 (R3<R4) at which a transmitted light intensity is Tmax(45)/100 relative to a maximum transmitted light intensity of halogen light incident at an angle of 45° to the film surface of Tmax(45).

4. The light source unit according to claim 1, wherein in the reflective film, a scattering angle (R6−R5) on at least one film surface is 3° or less, where the scattering angle is obtained from angles R5 and R6 (R5<R6) at which a transmitted light intensity is Tmax(0)/2 relative to a maximum transmitted light intensity of halogen light incident perpendicularly to the film surface of Tmax(0).

5. The light source unit according to claim 1, wherein at least one film surface of the reflective film has an L*(SCI) value of 60 or more, the L*(SCI) value being obtained by reflection measurement with a colorimeter.

6. The light source unit according to claim 1, wherein at least one film surface of the reflective film has an L*(SCE) value of 30 or more, the L*(SCE) value being obtained by reflection measurement with a colorimeter.

7. The light source unit according to claim 1, wherein at least one film surface of the reflective film has an L*(SCI)/L*(SCE) value of 2.5 or less, the L*(SCI)/L*(SCE) value being obtained by reflection measurement with a colorimeter.

8. The light source unit according to claim 1, wherein the reflective film has a haze value of 2% or more and 20% or less.

9. The light source unit according to claim 1, wherein the reflective film is a laminated film including an alternate laminate of 11 or more layers containing a plurality of different thermoplastic resins.

10. The light source unit according to claim 9, wherein the reflective film contains a scatterer, and the scatterer has a size of 1.5 μm or more and 10 μm or less.

11. The light source unit according to claim 10, wherein an outermost layer of the reflective film has a content of the scatterer of 0.1 wt % or less based on the outermost layer.

12. A display comprising the light source unit according to claim 1.

13. A reflective film comprising:
a transmission band in which a transmittance at an incident angle of 0° is 80% or more over a continuous section of 50 nm or more in a wavelength range of 400 to 700 nm; and
a reflection band having a bandwidth of 50 nm or more and on a longer wavelength side than the transmission band,
wherein a scattering angle (R2−R1) on at least one film surface is 5° or more, where the scattering angle is obtained from angles R1 and R2 (R1<R2) at which a transmitted light intensity is Tmax(0)/100 relative to a maximum transmitted light intensity of halogen light incident perpendicularly to the film surface of Tmax(0).

14. The reflective film according to claim 13, wherein a scattering angle (R4−R3) on at least one film surface is 5° or more, where the scattering angle is obtained from angles R3 and R4 (R3<R4) at which a transmitted light intensity is Tmax(45)/100 relative to a maximum transmitted light intensity of halogen light incident at an angle of 45° to the film surface of Tmax(45).

15. The reflective film according to claim 13, wherein a scattering angle (R6−R5) on at least one film surface is 3° or less, where the scattering angle is obtained from angles R5 and R6 (R5<R6) at which a transmitted light intensity is Tmax(0)/2 relative to a maximum transmitted light intensity of halogen light incident perpendicularly to the film surface of Tmax(0).

16. The reflective film according to claim 13, having an L*(SCI)/L*(SCE) value of 2.5 or less, the L*(SCI)/L*(SCE) value being obtained by reflection measurement with a colorimeter.

17. The reflective film according to claim 13, being a laminated film including an alternate laminate of 11 or more layers containing a plurality of different thermoplastic resins.

18. The reflective film according to claim 17, comprising a scatterer, wherein the scatterer has a size of 1.5 μm or more and 10 μm or less.

19. The reflective film according to claim 18, wherein an outermost layer of the reflective film has a content of the scatterer of 0.1 wt % or less based on the outermost layer.

* * * * *